US005814792A

United States Patent [19]

Wildi

[11] Patent Number: 5,814,792

[45] Date of Patent: Sep. 29, 1998

[54] EXTRA-LOW VOLTAGE HEATING SYSTEM

[75] Inventor: Theodore Wildi, Quebec, Canada

[73] Assignee: Sperika Enterprises Ltd., Quebec, Canada

[21] Appl. No.: 670,413

[22] Filed: Jun. 26, 1996

[51] Int. Cl.[6] .............................. H05B 3/44; H05B 1/00; H01C 3/02; H04B 3/28

[52] U.S. Cl. ........................... 219/544; 219/213; 338/61; 307/91

[58] Field of Search .................................... 219/212, 213, 219/527, 528, 529, 544; 338/226, 227, 61, 62, 63; 307/89, 90, 91

[56] References Cited

U.S. PATENT DOCUMENTS

| | | | |
|---|---|---|---|
| 2,042,742 | 6/1936 | Taylor . | |
| 2,287,502 | 6/1942 | Togesen et al. . | |
| 3,213,300 | 10/1965 | Davis . | |
| 3,223,825 | 12/1965 | Williams . | |
| 3,364,335 | 1/1968 | Palatini et al. . | |
| 4,262,215 | 4/1981 | Yanabu et al. | 307/91 |
| 4,547,658 | 10/1985 | Crowley | 219/212 |
| 4,556,874 | 12/1985 | Becker | 337/242 |
| 4,908,497 | 3/1990 | Hjortsberg . | |
| 4,998,006 | 3/1991 | Perlman . | |
| 5,068,543 | 11/1991 | Ohkawa | 307/91 |
| 5,081,341 | 1/1992 | Rowe . | |
| 5,218,185 | 6/1993 | Gross | 219/212 |
| 5,218,507 | 6/1993 | Ashley | 307/91 |
| 5,360,998 | 11/1994 | Walling | 307/91 |
| 5,403,992 | 4/1995 | Cole | 219/212 |
| 5,410,127 | 4/1995 | LaRue et al. | 219/212 |

OTHER PUBLICATIONS

Documentaiton of the Threshold Limit Values, "For Physical Agents in the Work Environment", ACGIH, pp. PA–iii; PA–1 and PA–55 to PA–64.

*Primary Examiner*—Teresa Walberg
*Assistant Examiner*—Sam Paik
*Attorney, Agent, or Firm*—Swabey Ogilvy Renault; Guy J. Houle

[57] ABSTRACT

An extra-low-voltage heating system that produces a reduced magnetic field and which uses three insulated copper wires, or equivalents, as heating elements. Its low operating temperature, robustness and safety enable the system to be installed, for example, in floors and walls for the general heating of buildings, and in outdoor pavements, for snow-melting purposes, etc. The single-phase feeder busbars are configured to reduce the magnetic field around the feeder. A monitoring network continually checks the integrity of the heating system.

24 Claims, 15 Drawing Sheets

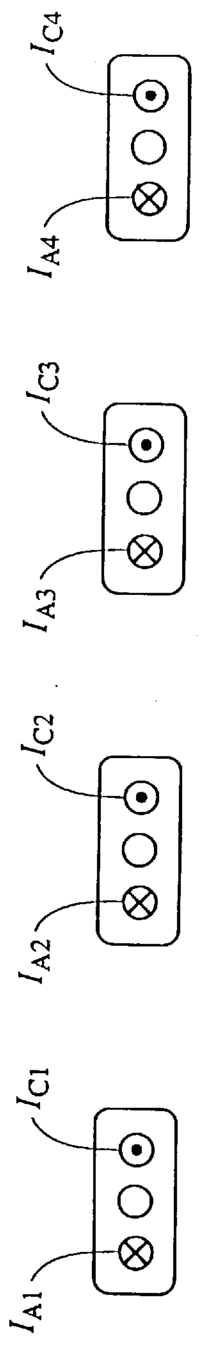
FIG. 9a similar-flow configuration (3-phase)
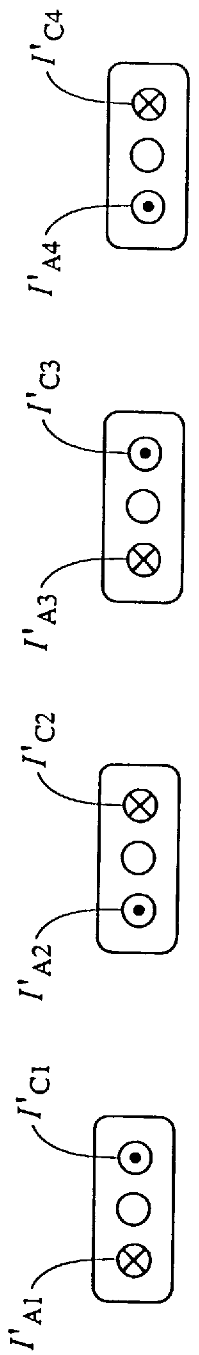
FIG. 9b alternate-flow configuration (3-phase)

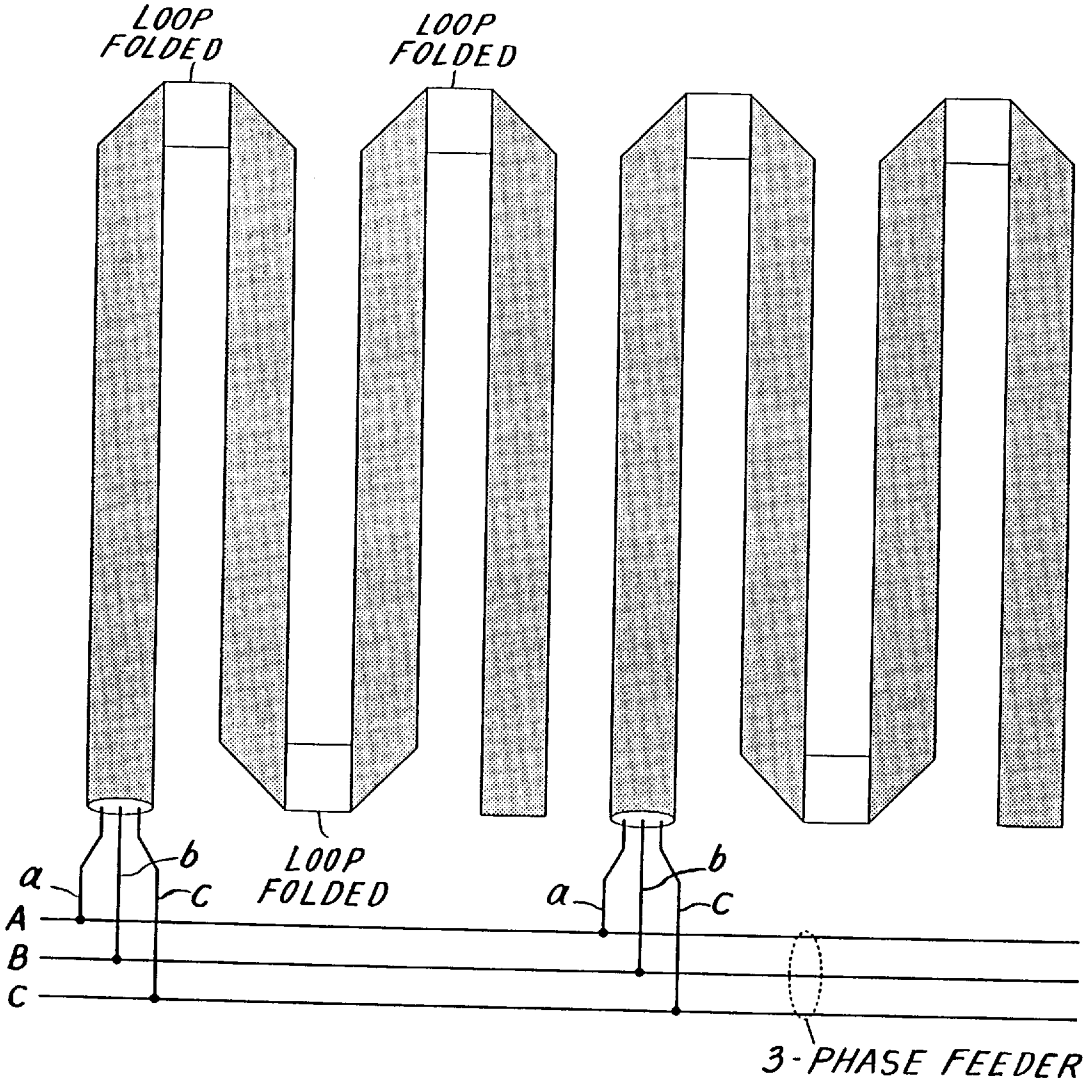
FIG. 10 Three-phase similar-flow configuration

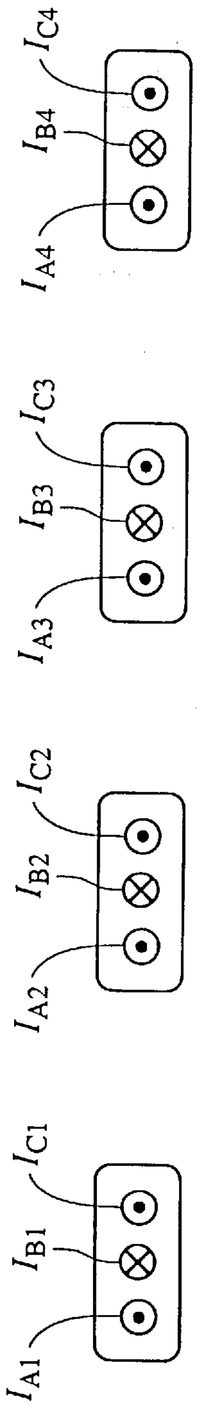
FIG. 16a similar-flow configuration (1-phase)
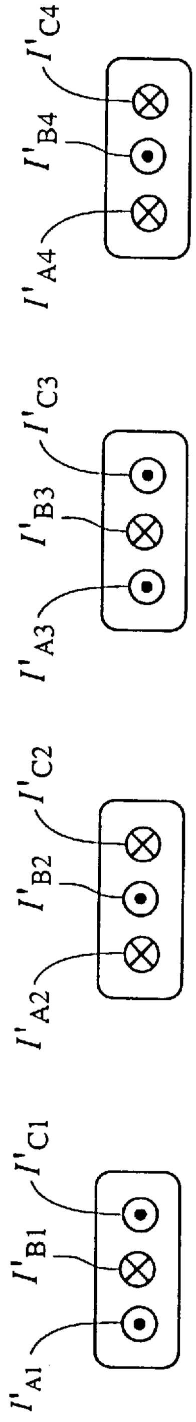
FIG. 16b alternate-flow configuration (1-phase)

EXTRA-LOW VOLTAGE HEATING SYSTEM

TECHNICAL FIELD

This invention relates to an extra-low-voltage heating system wherein the magnetic field is reduced around the heating cables. Each cable contains three wires that are configured and interconnected in a specific way so as to minimize the magnetic field surrounding the cable.

Also, the heating cables are themselves configured so as to reduce the magnetic field at points that are close to the heated surface. In 3-phase heating systems, the wires of the heating cables are connected in star form and are further connected to the feeder in a specific way. In single-phase heating systems, the said star form is also connected to the single phase feeder in a specific way. By positioning a bare conductor in close proximity to the three wires, and connecting it to a monitoring device, the integrity of the system can be continually monitored. A special single-phase feeder, producing a particularly low magnetic field, is also described.

BACKGROUND ART

Extra-low-voltage systems for heating concrete floors have been used in the past by circulating an electric current in the reinforcing steel wire mesh within a concrete slab. In these 60 Hz systems, the voltage is typically limited to a maximum of 30 volts. These extra-low-voltage systems offer many advantages, but they also have some shortcomings as follows:

1. On account of the low voltage and relatively high power, large currents are required, which generate a strong magnetic field around the busbars and wire meshes.
2. The magnetic field interferes with the image on some computer and television screens, causing it to jitter. It has been found that in order to reduce the jitter to an acceptable level, the peak flux density must be less than 5 microteslas (5 $\mu$T), which corresponds to 50 milligauss (50 mG). In some extra-low-voltage heating systems of the prior art, the flux density can exceed 100 $\mu$T (1000 mG) at a distance of 5 feet above the floor.
3. The magnetic field is perceived by some people to be a potential health hazard. Opinions vary as to the acceptable exposure limits to 50 Hz and 60 Hz magnetic fields. In a publication by the American Conference of Governmental Industrial Hygienists entitled Sub-Radio Frequency (30 kHz and below) Magnetic Fields, continuous exposure limits of 100 $\mu$T (1000 mG) are suggested for members of the general public.

It should be noted that the ambient 60 Hz flux density in a home is typically 1 mG to 2 mG, while that along a busy street ranges from 0.5 mG to 5 mG. The flux density near a coffee machine equipped with an electric clock varies from 10 mG to over 100 mG, depending upon the distance from the machine.

The SI unit of magnetic flux density is the tesla. One microtesla (1 $\mu$T) is equal to 10 milligauss (10 mG).

This concern with possible biological effects has given rise to several methods of reducing the magnetic fields of electric heating systems. In this regard, we make reference to the following patents:

U.S. Pat. No. 5,081,341 to William M. Rowe issued Jan. 14, 1992, describes how a magnetic field can be reduced by arranging wires in a helical manner so that currents flow in essentially opposite directions.

U.S. Pat. No. 4,998,006 to Daniel Perlman issued on Mar. 5, 1991, there is described how a magnetic field can be reduced by arranging wires in parallel so that currents flow in essentially opposite directions. U.S. Pat. No. 4,908,497 to Bengt Hjortsberg, issued Mar. 13, 1990, describes how a magnetic field can be reduced by arranging successive rows of four wires in series so that currents flow in essentially opposite directions. These patents are mainly concerned with low-power devices such as comfort heaters and water beds that are in particularly close contact with the human body.

U.S. Pat. No. 3,364,335 to B. Palatini et al, issued on Jan. 16, 1968 describes a relatively high voltage three-phase heating system to reduce the size of the conductors. The objective is to eliminate the danger of high voltages by using a differential protection. There is no mention of magnetic fields. U.S. Pat. No. 3,223,825 to C. I. Williams issued on Dec. 14, 1965 discloses the use of reinforcing steel bars in concrete to carry heating current. Three-phase power is used but the individual heating of bars is single-phase. Various circuit configurations are given with design examples. There is no mention of magnetic fields. U.S. Pat. No. 2,042,742 to J. H. Taylor issued on Jun. 2, 1936 discloses the use of a 3-conductor insulated heating cable mounted on a panel, but no 3-phase source. The low temperature system uses copper wire as heating element. The Patent also states that circuits of considerable length can be made this way. There is no mention of magnetic fields. U.S. Pat. No. 3,213,300 to R. S. DAVIS issued on Oct. 19, 1965 describes the use of a low reactance cable. Finally, U.S. Pat. No. 2,287,502 to A. A. TOGESEN issued on Jun. 23, 1942 describes "closely spaced busbars within the pairs, effects a reduction in the magnetic field."

In my co-pending U.S. patent application Ser. No. 08/659,180 filed on Jun. 6, 1996, and entitled "Low-Voltage and Low Flux Density Heating System", there is described a low-voltage heating system wherein the magnetic field is reduced, both around the heating cables and the feeder that supplies power to the cables. Each cable contains six wires that are configured and interconnected in a specific way so as to minimize the magnetic field surrounding the cable. A monitoring system is provided whereby the integrity of the system can be maintained. A three-phase five-conductor feeder is also described whereby the magnetic field surrounding the feeder is reduced.

BACKGROUND INFORMATION

It is well known that an ac current flowing in a long, straight wire produces an alternating magnetic field in the space around the wire. The magnetic field is constantly increasing, decreasing and reversing. In a 60 Hz system, the flux density reaches its maximum value 120 times per second. The flux density is given by the well-known physical equation:

$$B = \frac{2I}{x} \tag{1}$$

in which

B=maximum flux density at the point of interest, in milligauss [mG]

I=peak current flowing in the wire, in amperes [A]

x=shortest distance between the center of the wire and the point of interest, in meters [m].

Among its other features, the invention disclosed herein describes a 3-phase heating cable that produces a reduced magnetic field. In commercial and industrial 3-phase installations, the three currents $I_A$, $I_B$, $I_C$ flowing in a 3-wire cable vary sinusoidally according to the equations:

$$I_A = I_m \cos \omega t \quad (2)$$

$$I_B = I_m \cos (\omega t - 120) \quad (3)$$

$$I_C = I_m \cos (\omega t - 240) \quad (4)$$

In these equations, $I_m$ is the peak current, $\omega$ is the angular frequency in degrees per second, t is the time in seconds, and $\omega t$ is the time expressed in electrical degrees. Table 1 shows the instantaneous currents flowing in the three wires at various instants of time, during one cycle. An angle $\omega t$ of 360 degrees corresponds to 1/f seconds, where f is the frequency of the power source.

TABLE 1

| $\omega t$ | $I_A$ | $I_B$ | $I_C$ |
|---|---|---|---|
| 0 | $I_m$ | $-0.5\ I_m$ | $-0.5\ I_m$ |
| 30 | $0.866\ I_m$ | 0 | $-0.866\ I_m$ |
| 60 | $0.5\ I_m$ | $0.5\ I_m$ | $-I_m$ |
| 90 | 0 | $0.866\ I_m$ | $-0.866\ I_m$ |
| 120 | $-0.5\ I_m$ | $I_m$ | $-0.5\ I_m$ |
| 150 | $-0.866\ I_m$ | $0.866\ I_m$ | 0 |
| 180 | $-I_m$ | $0.5\ I_m$ | $0.5\ I_m$ |
| 210 | $-0.866\ I_m$ | 0 | $0.866\ I_m$ |
| 240 | $-0.5\ I_m$ | $-0.5\ I_m$ | $I_m$ |
| 270 | 0 | $-0.866\ I_m$ | $0.866\ I_m$ |
| 300 | $0.5\ I_m$ | $-I_m$ | $0.5\ I_m$ |
| 330 | $0.866\ I_m$ | $-0.866\ I_m$ | 0 |
| 360 | $I_m$ | $-0.5\ I_m$ | $-0.5\ I_m$ |

The instantaneous magnetic field surrounding a cable depends upon the configuration of the wires and the instantaneous currents they carry.

Because the currents are alternating, they change in value and direction from one instant to the next. It is therefore necessary to determine when the flux density is maximum and what its value is at that particular moment. I have derived formulas, based upon Eq. (1), that describe the flux densities around cables having different wire configurations. I use one three-phase wire configuration that produces good results. It involves a cable having three coplanar wires; the formulas for this special configuration are revealed in subsequent sections.

When heating a flat surface, such as a wall or floor, the magnetic flux density above the surface depends upon the vector sum of the flux densities produced by all the cables. Thus, to determine the maximum flux density at a given point perpendicular to the surface, the configuration of the cables has to be taken into account, in addition to the configuration of the wires within the cables. I have found that in 3-phase and single-phase systems, a specific cable configuration produces particularly low flux densities at points located close to the heated surface.

SUMMARY OF THE INVENTION

This invention concerns an extra-low-voltage, 3-phase heating system that produces a reduced magnetic flux density. It comprises a plurality of three-wire heating cables that are connected to a common 3-phase feeder.

The feeder is powered by a step-down transformer whose secondary line-to-line voltage is 30 V or less, to remain within the extra-low-voltage class. The heating system is principally, although not exclusively, intended for heating a flat surface and among its several applications, the system is designed for direct burial in a concrete floor, with the cables lying about 50 mm below the surface. The cables are designed to produce a specified amount of thermal power per unit length, $P_C$ (watts per meter). The maximum value of $P_C$ depends upon the maximum allowable temperature of the cable. The temperature is typically limited to a maximum of 60° C. or 90° C. Consequently, the heating system can be considered to be a low-temperature system. When desired, values of $P_C$ less than said maximum can be used.

Individual cables may have one or more cable runs. If there is more than one cable run per cable, the cable runs are contiguous and generally of equal length, laid out in sinuous fashion. The cable runs of the plurality of cables covering a given heated surface are laid out side by side, with the distance between runs being determined by $P_C$ and the required thermal power density $P_D$ (watts per square meter).

The invention seeks to reduce the magnetic flux density around the cables, and around the heated surface. The invention also includes a monitoring system whereby potential damage to cables may be detected, causing power to be disconnected. The monitoring means also enables the fault to be located. Finally, the invention includes a single-phase feeder that produces a reduced magnetic field.

Each heating cable of this invention comprises three insulated wires, arranged in a single row, along a horizontal axis. The wires are in close proximity to each other. The wires in the cable are specially configured and interconnected so as to minimize the magnetic field around the cable. The wires are connected in star form (a term well known in three-phase circuits) to create what I call a star cable, for purposes of ready identification. Furthermore, the cables themselves are configured to reduce even more the resultant flux density near the flat heated surface.

The said wires are made of a low resistivity material, such as copper. The said 3-wire star cable can also be powered by a single-phase source by connecting it to the source in a specific way. The specific connection is again designed to minimize the magnetic field around the cable.

The present invention also includes special formulas that have been derived to permit the approximate calculation of the magnetic flux densities surrounding the cables.

The following features also form part of this invention:

1) Safety. The extra-low-voltage of the heating system ensures safety from electric shock;
2) Robustness. The cable contains three wires and hence is able to withstand considerable mechanical abuse while it is being installed;
3) Insulation. The cable and its wires are insulated; consequently, the cables can come in direct contact with adjoining metal parts;
4) Balanced 3-phase system. The heating cables constitute an inherently balanced three-phase load which meets electric power utility requirements.
5) Low temperature. The heating system operates at low temperatures which ensures long life and reduces the fire hazard.

BRIEF DESCRIPTION OF DRAWINGS

A preferred embodiment of the present invention will now be described with reference to the accompanying drawings, which show various examples of the invention, including its several advantages:

FIG. 9*a* is a schematic diagram of four adjacent 3-phase cable runs wherein the currents in correspondingly-located wires have the same magnitude and same direction, giving rise to a 3-phase similar-flow configuration.

FIG. 9*b* is a schematic diagram of four adjacent 3-phase cable runs wherein the currents in correspondingly-located wires have the same magnitude but alternately flow in opposite directions, giving rise to a 3-phase alternate-flow configuration.

FIG. 10 is a schematic diagram of two star cables each comprising four cable runs, connected to a three-phase feeder and wherein a similar-flow configuration is obtained at an instant when the flux density is maximum.

FIG. 16*a* is a schematic diagram of four adjacent single-phase cable runs wherein the currents in correspondingly-located wires have the same magnitude and same direction, giving rise to a single-phase similar-flow configuration.

FIG. 16*b* is a schematic diagram of four adjacent single-phase cable runs wherein the currents in correspondingly-located wires have the same magnitude but alternately flow in opposite directions, giving rise to a single-phase alternate-flow configuration.

DESCRIPTION OF PREFERRED EMBODIMENTS

Figure 1:
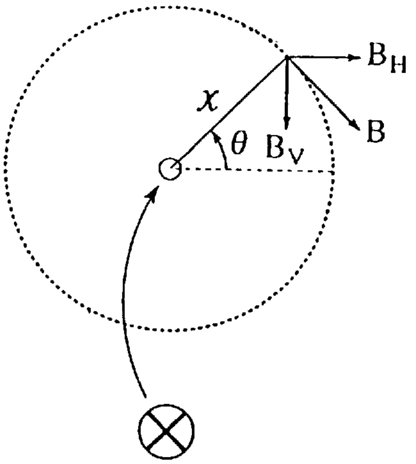
FIG. 1 is a schematic diagram showing the cross section of a single wire carrying a current, and the resulting magnetic flux density it produces, together with the horizontal and vertical components of the flux density.

Referring to FIG. 1, there is shown the cross section of a single wire carrying an alternating current having an instantaneous value I. The "cross" of the conventional dot/cross notation indicates that the current is flowing into the page. As previously stated, the value of the flux density is given by:

$$B = \frac{2I}{x} \qquad \text{Eq. 1}$$

It is well known that this flux density is directed at right angles to a ray having a radius x whose origin coincides with the center of the wire. It follows that the horizontal and vertical flux density components $B_H$ and $B_V$ at the end of a ray inclined at θ degrees to the horizontal, are respectively given by:

$$B_H B \sin\theta \qquad (5)$$

$$B_V = B \cos\theta \qquad (6)$$

Figure 2A:
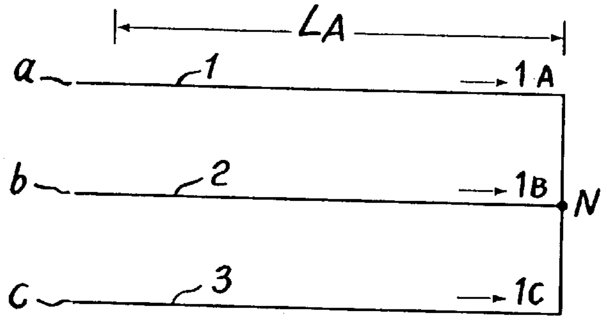
FIG. 2*a* is a schematic diagram showing a star cable.

For the current direction shown (into the page), positive values of $B_H$ are directed to the right, while positive values of $B_V$ are directed downwards. FIG. 2*a* is a schematic diagram showing a cable having three straight wires 1, 2, 3, that are parallel and in close proximity to each other. The cable has a length $L_A$. At a far end of the cable, opposite to the source, wires 1, 2, 3 are connected together at junction N while connecting leads a, b, c at a near end, are connected to a 3-phase source (not shown). The wires are therefore connected in star. For convenience, I call this a star cable.

The wires carry 3-phase sinusoidal alternating currents $I_A$, $I_B$, $I_C$, which respectively flow in the wires 1, 2, 3, as shown in the Figure. The line currents flowing in connecting leads a, b, c reach peak values of $I_{S3}$ where subscript S stands for star and subscript 3 stands for 3-phase source. The currents are considered to be positive when they flow in the direction of the arrows. For example, when $I_B$=+17 A, the current $I_B$ is actually flowing in the direction of the arrow shown in wire 2.

Figure 2B:
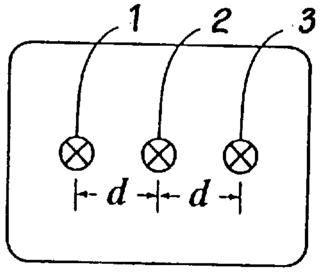
FIG. 2*b* shows its cross section and wire configuration.

FIG. 2*b* is a cross section view of the star cable, showing the preferred configuration of the three wires, arranged in a single row along a horizontal axis. Wires 1, 2, 3 are coplanar and the distance between adjacent wires in each row is d. Distances d are measured between the centers of the wires. Outer wires 1 and 3 are respectively on the left-hand side and right-hand side of inner wire 2.

The crosses in FIG. 2_b_ indicate the direction of current flow when the respective currents are positive. Thus, when $I_B$=+17 A, the current in wire 2 is 17 A flowing into the page (away from the reader).

Figure 3:
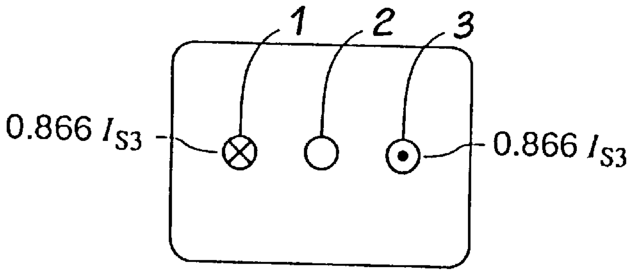
FIG. 3 is a schematic cross section view of a star cable, when connected to a three-phase source, showing the magnitude and actual direction of current flows in the wires, at the moment when the flux density surrounding the cable is maximum.
Figure 4:
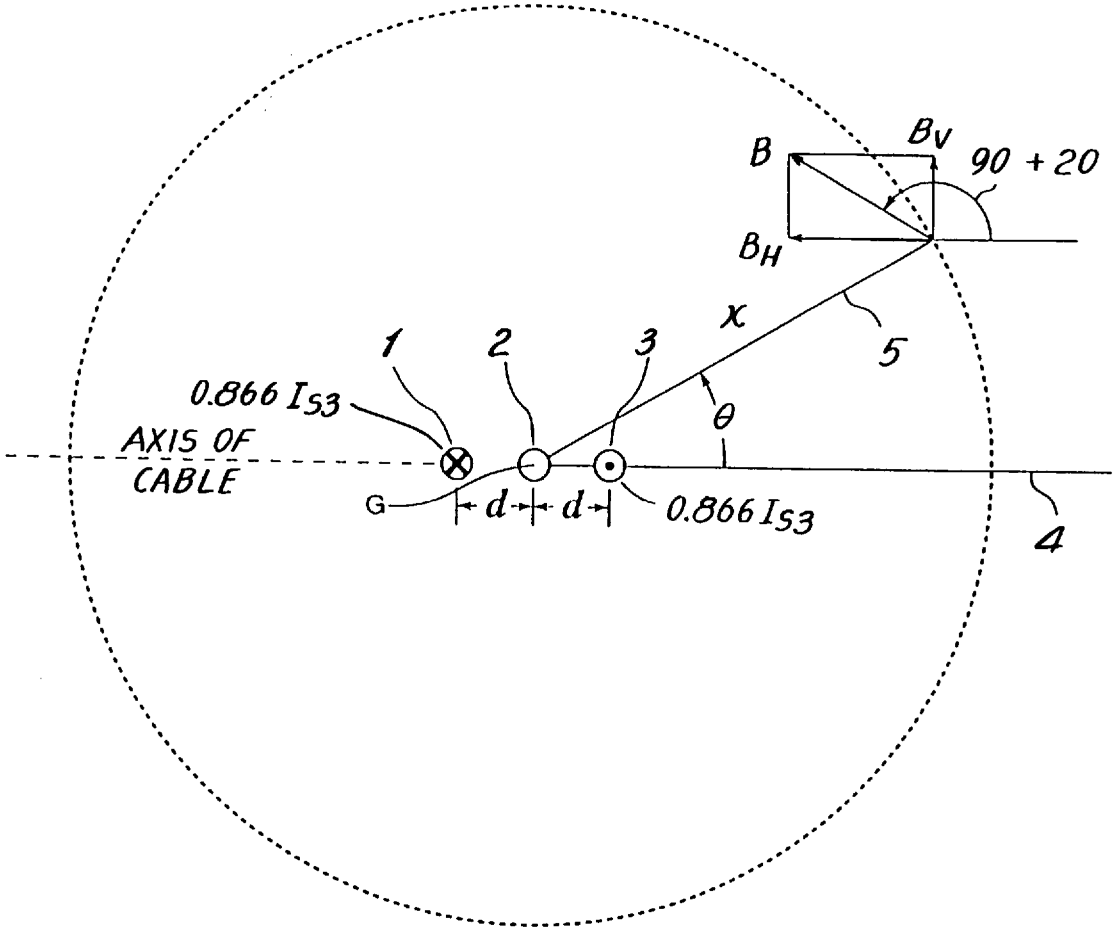
FIG. 4 is a cross section view of a star cable, when connected to a three-phase source, showing the magnitude and direction of current flow and the resulting flux density components at one point, when the flux density is maximum.

The flux density surrounding the cable changes from instant to instant but it reaches a maximum during each half cycle. I have discovered that when the wires are configured as shown in FIG. 2_b_, the flux density surrounding the cable is maximum when the current in the inner wire 2 is zero. Based upon the information given in Table 1, this means that the instantaneous currents in the outer wires 1, 3 are equal (in magnitude) to 0.866 $I_{S3}$. Furthermore, at this instant, the currents in the outer wires flow in opposite directions. Thus, as shown in FIG. 3, when current in wire 1 flows into the page, the current in wire 3 flows out of the page (toward the reader). One half cycle later, the currents will have the same magnitudes but their respective directions will be the opposite to that shown in FIG. 3. I have derived an expression for the flux density surrounding the cable at this particular moment of maximum flux density. Referring to FIG. 4, consider a ray 4 that lies on the horizontal axis of the star cable and extends to the right from the geometric center G of the three wires. The geometric center coincides with the center of the inner wire. Next, consider a ray 5 of length x inclined at an angle θ to the horizontal axis. It turns out that the maximum flux density B at this distance x is given approximately by the expression:

$$B = \frac{2\sqrt{3}\, I_{S3} d}{x^2} = \frac{3.46 I_{S3} d}{x^2} \qquad (7)$$

The horizontal and vertical components of this flux density are found to be respectively:

$$B_H = B \cos (90+2\theta) \qquad (8)$$

$$B_V = B \sin (90+2\theta) \qquad (9)$$

In these equations,

B=maximum flux density, [mG];

x=radial distance from the geometric center of the three wires, [m];

$I_{S3}$=peak line current of the star cable, [A];

d=distance between adjacent wires in a row, [m];

θ=angle between the horizontal axis of the cable and the ray joining its geometric center to the point of said maximum flux density, [°]

90=constant angle, [°].

For the current directions shown in FIG. 4, positive values of $B_H$ are directed to the right, while positive values of $B_V$ are directed upwards.

Figure 5:
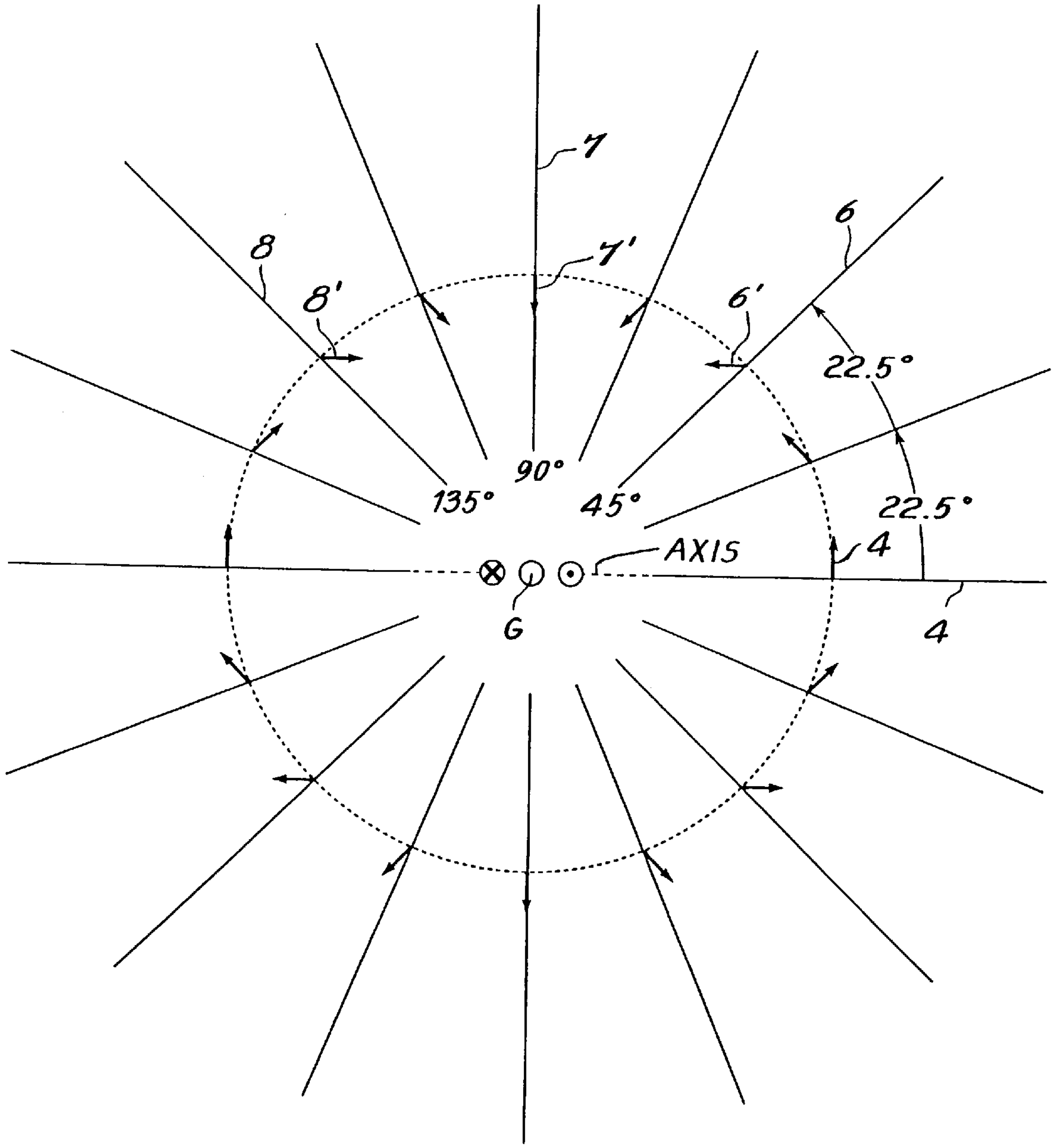
FIG. 5 is a schematic diagram showing the flux density pattern surrounding a star cable when the flux density is maximum.

FIG. 5 is a pictorial representation of Eqs. (7), (8) and (9), and shows in greater detail the nature of the flux density pattern surrounding the three-phase star cable when the flux density is maximum. A set of hypothetical rays, such as 4, 6, 7, 8, centered at geometric center G and spaced at intervals of 22.50, are superposed on the three-wire cable. The flux orientation associated with each ray is shown by a short arrow. Thus, for the horizontal ray 4, directed along the horizontal axis of the cable, the flux density vector 4' is directed vertically upwards everywhere along the ray.

On the other hand, for every point along ray 6, oriented at 45° to the horizontal axis, the flux density vector 6' is directed horizontally towards the left. The reason is that for this ray, $B_H$=B cos (90°+2×45°)=B cos 180°=−B, while $B_V$=B sin (90°+2×45°)=B sin 180°=0. Similarly, flux density vector 7' associated with ray 7, and flux density vector 8' associated with ray 8 are respectively directed downwards and to the right.

Equation (7) reveals that the flux density along each ray decreases inversely as the square of the distance x from the geometric center G. Consequently, the flux density along any ray decreases rapidly with increasing values of x. However, for any given ray the orientation of the flux density vector with respect to the said horizontal axis remains fixed. The magnitude of the flux density at a given point also depends linearly upon the spacing d between adjacent wires; the closer the spacing the lower the flux density. For a given cable, the spacing is obviously fixed.

Although Eq. (7) is approximate, I have found that if x is greater than 5 d, the calculated value of B is accurate to better than ±5%. For example, if $I_{S3}$=23 A, d=4 mm, and x=22 mm, the value of B, to an accuracy of better than ±5% is:

$$B = \frac{2\sqrt{3}\, I_{S3} d}{x^2} = \frac{2\sqrt{3} \times 23 \times 0.004}{0.022^2} = 658 \text{ mG} \qquad \text{Eq. 7}$$

The configuration of the wires and the direction and magnitude of the current flows as shown in FIGS. 2 and 4 are essential to obtain the results expressed by Eqs. (7), (8) and (9). For example, in FIG. 4, if the wires were arranged in triangular configuration with equal distances between the three wires, the resulting flux density patterns would be different.

DESCRIPTION OF HEATING SYSTEM

Figure 6:
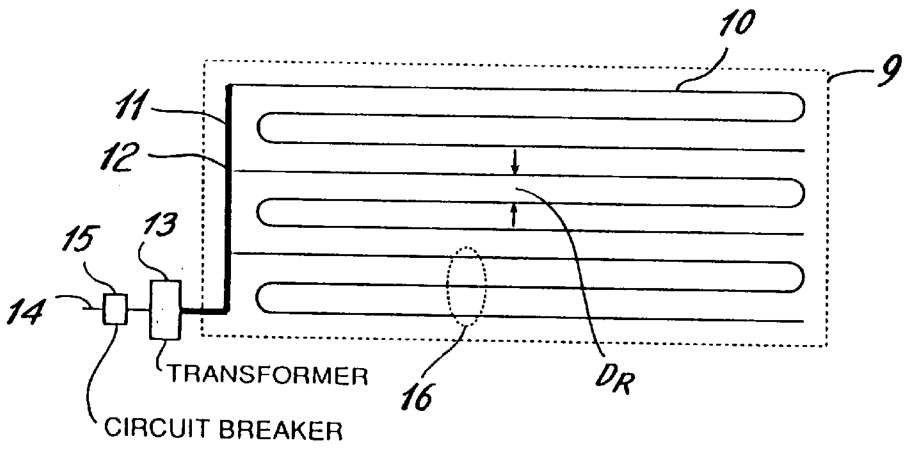
FIG. 6 is a schematic diagram showing the essential elements of the extra-low-voltage heating system covered by the present invention.

FIG. 6 reveals the basic elements of the extra-low-voltage heating system covered by this invention. A surface area 9 is heated by means of a plurality of three-phase cables 10 that are connected to a three-phase feeder 11 by means of connections 12. The feeder is powered by a three-phase stepdown transformer 13 that is connected on its primary side to a 3-phase supply line 14 by means of circuit-breaker 15. The secondary line-to-line voltage is 30 V or less, to keep the system in the extra-low-voltage class.

As previously described, each heating cable 10 consists of three insulated wires that are in close proximity to each other. The cables develop a thermal power of PC watts per unit length. The value of PC depends upon several factors, such as the feeder voltage, the wire size, the length of cable and the resistivity of the wire material. For a given voltage, wire size and wire material, the cable lengths are set so that the resulting value of PC maintains the temperature of the wires at or below the rated temperature of the cable. The rated temperature is typically less than 90° C.

The cable runs are spaced at such a distance $D_R$ from each other so as to develop the desired thermal power density $P_D$ required by the heated surface area. The value of $D_R$ is given by:

$$D_R = P_C / P_D \qquad (10)$$

in which $D_R$=distance between cable runs [m]

$P_C$=thermal power per unit length [W/m]

$P_D$=thermal power density [W/m$^2$]

In FIG. 6, each cable makes three contiguous runs, labeled 16.

The voltage between busbars along the length of the feeder 11 is essentially constant and equal to 30 V or less. The feeder current at the transformer terminals is equal to the sum of the currents drawn by the cables. It is clear that the current in the feeder decreases progressively from a maximum at the transformer terminals to zero at the far end of the feeder. Consequently, the magnetic flux density surrounding the feeder reaches its greatest value near the transformer.

Figure 7:
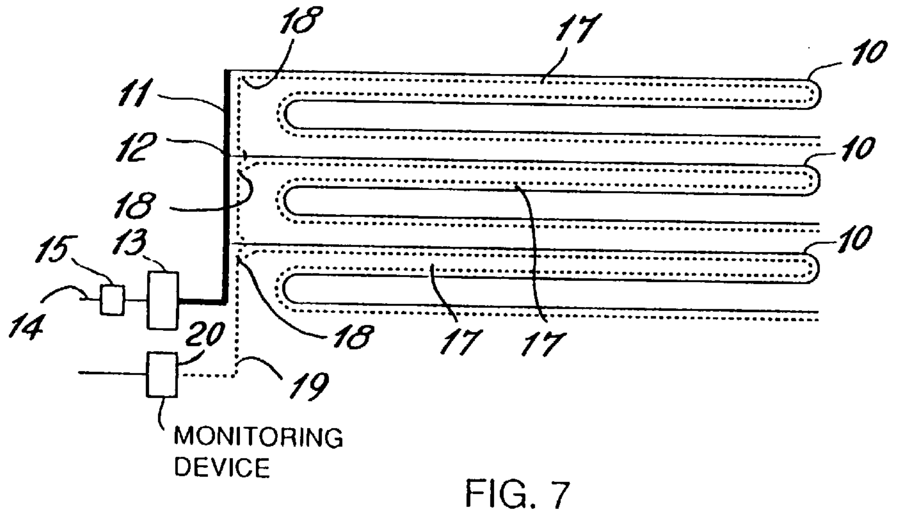
FIG. 7 is a schematic diagram showing the monitoring system that checks the integrity of the extra-low-voltage heating system.

FIG. 7 is another embodiment of the heating system of the present invention wherein a monitoring network is added. In this network, each heating cable contains, in addition to its heating wires, a bare metallic sensing wire or braid 17, shown dotted. Each sensing wire is connected at point 18 to a single insulated conductor 19 that follows the general direction of the feeder and terminates at a monitoring device 20. This low-power device applies a voltage between the sensing wires and the respective heating wires of the cables. If for any reason the insulation between a sensing wire and the heating wires of a cable should become damaged, a small current will flow, causing the monitoring device to trip circuit breaker 15. As a result, the heating system will be shut down. The nature of this monitoring device will be explained later in this disclosure.

Figure 8:
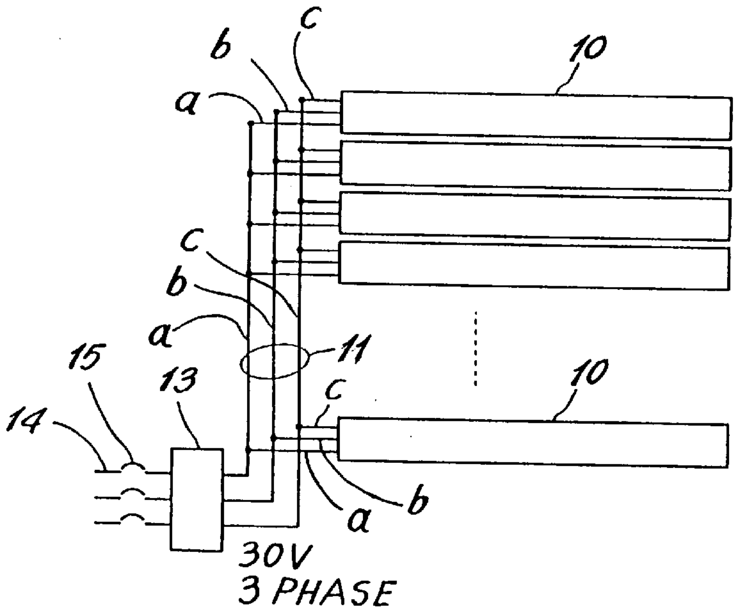
FIG. 8 is a schematic diagram showing in greater detail the cables and feeder of a 3-phase extra-low-voltage heating system but wherein the monitoring system is not shown.

FIG. 8 shows in greater detail the method of connecting the 3-wire cables to a conventional 3-phase feeder having three busbars A, B, C. In this Figure, the cables have a single run. The three leads a, b, c of each cable are connected to busbars A, B, C. Care is taken to make all connections the same. Towards this end, the connecting leads a, b, c must be marked (such as by color coding), to ensure that the correct leads are connected to the respective busbars. Furthermore, one of the flat sides of the cable, parallel to the horizontal axis, must also bear a marking. The reason is that proper lead connections and proper cable configurations are needed to minimize the flux density in regions close to the heated surface.

CABLE CONFIGURATION (three-phase source)

In this 3-phase heating system, proper cable configuration means that the horizontal axes of the cables are coplanar and lie substantially parallel to the plane of the surface to be heated.

Proper cable configuration also comprises the proper instantaneous direction of current flow in successive cable runs at the instant when the flux density is maximum. We recall (FIG. 3) that the maximum flux density of each cable occurs when the current in the inner wire is momentarily zero. The currents in the outer wires are then equal in magnitude but flow in opposite directions.

FIG. 9*a* is a cross section view of a portion of a heated surface showing four representative adjacent cable runs wherein the currents in the inner wires are momentarily zero. In this Figure, the magnitudes and directions of the currents flowing in correspondingly-located wires are respectively the same. Thus, currents $I_{A1}$, $I_{A2}$, $I_{A3}$, $I_{A4}$, flowing in the outer wires on the left-hand side of each run are substantially equal, and flow in the same direction, into the paper. Similarly, currents $I_{C1}$, $I_{C2}$, $I_{C3}$, $I_{C4}$ flowing in the outer wires on the right-hand side of each run are substantially equal and flow in the same direction, out of the paper. For purposes of ready identification, I call this a 3-phase similar-flow configuration.

On the other hand, FIG. 9*b* is a cross section view of a portion of yet another heated surface showing four representative adjacent cable runs wherein the currents in the inner wires are again momentarily zero. However, the directions of current flows in correspondingly-located outer wires are alternately opposite. Thus, currents $I'_{A1}$, $I'_{A2}$, $I'_{A3}$, $I'_{A4}$, flowing respectively in the outer wires on the left-hand side of each run have substantially the same magnitudes, but flow in successively opposite directions, into and out of the paper. Similarly, currents $I'_{C1}$, $I'_{C2}$, $I'_{C3}$, $I'_{C4}$, flowing respectively in the outer wires on the right-hand side of each run have substantially the same magnitudes, but flow successively in opposite directions, out of and into the paper. For purposes of ready identification, I call this a 3-phase alternate-flow configuration.

Alternate-flow and similar-flow configurations have an important impact on the resultant flux density above a heated surface. FIG. 10 shows how two star cables, each comprising four contiguous runs, can be arranged to obtain the 3-phase similar-flow configuration when the flux density is maximum. The current flowing in the respective inner wire connecting leads b is then zero. The loops at the end of each run are folded as illustrated; the grey color marking along one of the flat sides of the cable constitutes a visual indication of the proper cable configuration.

In contrast, if the loops at the end of each run were twisted instead of folded, an alternate-flow configuration would result. In a plan view, alternate color markings would show up from one cable run to the next.

Flux density above a heated surface area (three-phase source)

Knowing the similar- or alternate-flow configuration, and the spacing $D_R$ between cable runs, the flux density at a given point perpendicular to the heated surface area can be calculated. In the case of star cables connected to a 3-phase source, Eqs. (7), (8), (9) can be applied to each run, and the respective horizontal and vertical components of flux density can be summed. Consequently, the resultant flux density at the given point can be found. In general, for a given height from the plane of the heated surface, the flux density tends to reach local peaks immediately above the cable runs.

Figure 11:
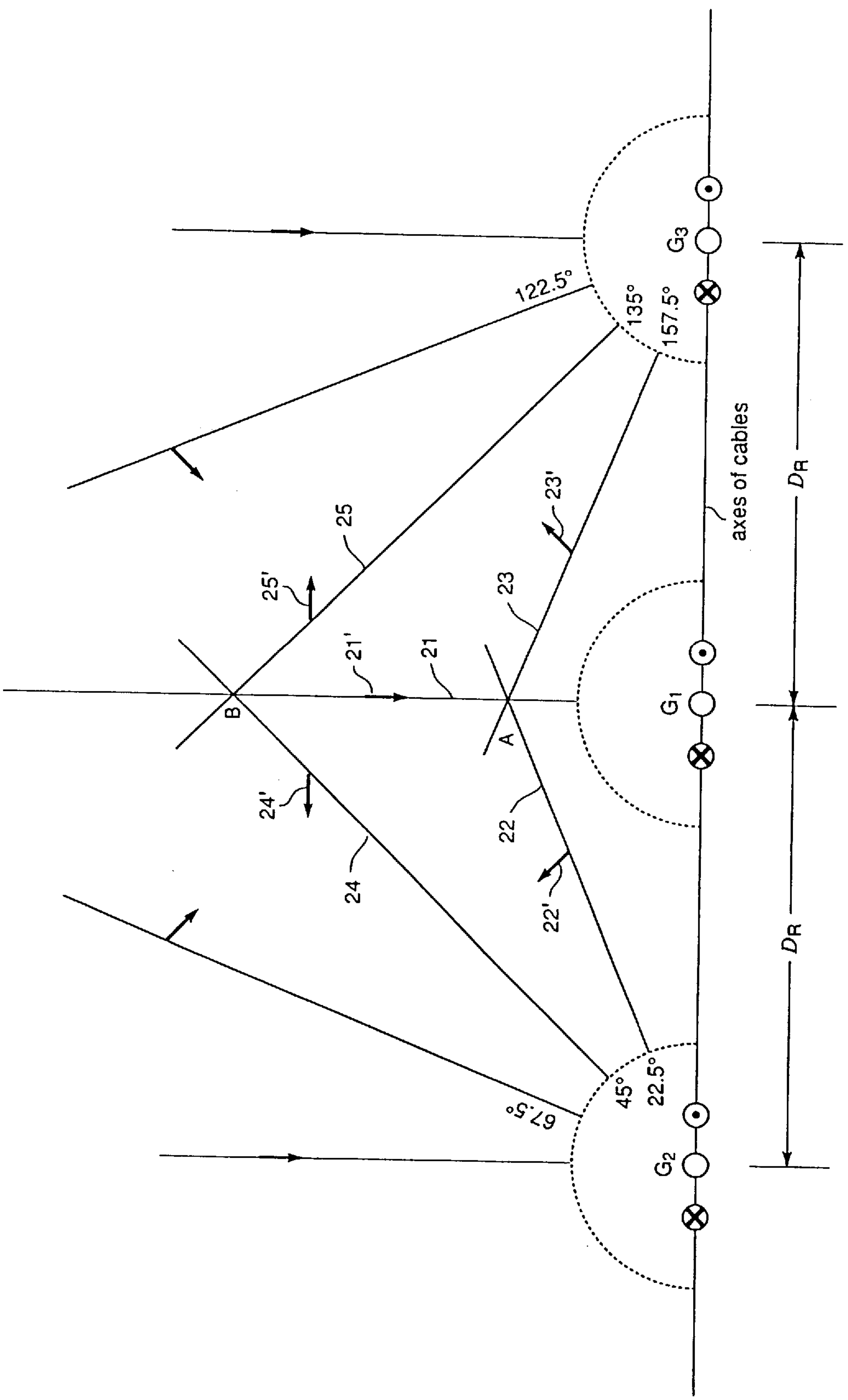
FIG. 11 is a schematic diagram showing the cross section and similar-flow configuration of three adjacent star cable runs laid out on a common plane, together with representative flux density patterns at the moment when the flux densities (created by the 3-phase currents), are maximum.

To visualize the resultant flux density pattern, it is helpful to examine the simple model of FIG. 11. It shows the flux density patterns of three adjacent cable runs $G_1$, $G_2$, $G_3$ having geometric centers that are also labeled $G_1$, $G_2$, $G_3$. The instant is selected when the flux density is maximum. Consequently, the currents in the inner wires are zero and the flux density pattern for each cable is the same as that previously illustrated in FIG. 5. The currents in correspondingly-located wires have the same magnitudes and directions, and so this is a similar-flow configuration.

We want to picture the resultant flux densities due to $G_1$, $G_2$, $G_3$. for heights H immediately above cable $G_1$. As regards the flux densities created by cable $G_1$, the vertical ray 21 is the only one we have to consider. It is associated with a flux density vector 21' that acts downwards, as previously seen in FIG. 5 for ray 7 and its associated flux density vector 7'.

Hypothetical rays also fan out at 22.5° intervals from the geometric centers of cables $G_2$, $G_3$. For distances immediately above cable $G_1$, the 22.5° ray 22 and the 157.5° ray 23 intersect at point A. Also, the 45° and 135° rays 24 and 25 intersect at point B.

Consider first rays 22 and 23 that intersect at point A. They are respectively associated with flux density vectors (such as 22' and 23') that are respectively oriented at 135° and 45° to the horizontal axis. At point A, their horizontal and vertical components have the same magnitude because their respective distances to the geometric centers $G_2$, $G_3$ are the same. However, the horizontal components act in opposition and therefore cancel each other, while the vertical components both act upwards. Consequently, at point A, these upward flux density components due to $G_2$ and $G_3$ act in opposition to the downward flux density 21' produced by $G_1$. It follows that the net flux density at point A is less than if cable run $G_1$ acted alone.

Next, turning our attention to rays 24 and 25, they are associated with flux density vectors (such as vectors 24' and 25') that are horizontal, equal and opposite. Consequently, at point B, these opposing flux densities cancel out and so the resultant flux density is equal to that produced by cable $G_1$ alone. Thus, for all points below point B, the flux density is less than that produced by cable $G_1$ alone. The reason is that any two rays emanating from $G_2$ and $G_3$ that intersect along the vertical line below point B are associated with flux densities that have a vertical component that is directed upwards (thereby opposing the flux density vector 21'), while the respective horizontal components cancel out. This can be seen by observing the orientation of the flux density vectors displayed in FIG. 5. Consequently, the similar-flow configuration shown in FIG. 11 is advantageous because it tends to reduce the flux density near the heated surface where the flux density tends to be large. Note that distance $BG_1$ corresponds to a height H equal to $D_R$.

It should be noted that the flux density above point B is larger than that produced by cable $G_1$ alone. The reason is that when the rays from $G_2$ and $G_3$ are steeper than 45°, they contain a vertical component that acts downwards, in the same direction as the flux density 21' produced by cable $G_1$. However, this is not a serious drawback because the flux densities at distances exceeding $D_R$ are small.

It can be seen that if cable run $G_1$ is surrounded by several additional cable runs on either side, the flux density is reduced still more for heights H less than $D_R$. However, for heights very close to cable $G_1$ (say, H=2d), the reduction in flux density is relatively small because the distances to surrounding cable runs are comparatively much larger.

If cable run $G_1$ is at the edge of a heated surface (say the left-hand edge), the cable runs to the left are absent. The reduction in flux density is then not as great as that, say, in the middle of the heated surface.

In conclusion, when the 3-phase similar-flow configuration is used, the flux density can be substantially less than that due to one cable alone, for heights H less than $D_R$ above the plane of the cables. If an alternate-flow configuration were used, the flux densities close to the heating surface would tend to be considerably larger, as demonstrated by reference to Example 3, in the section on Examples and Test Results.

Monitoring the integrity of the heating system

Figure 12:
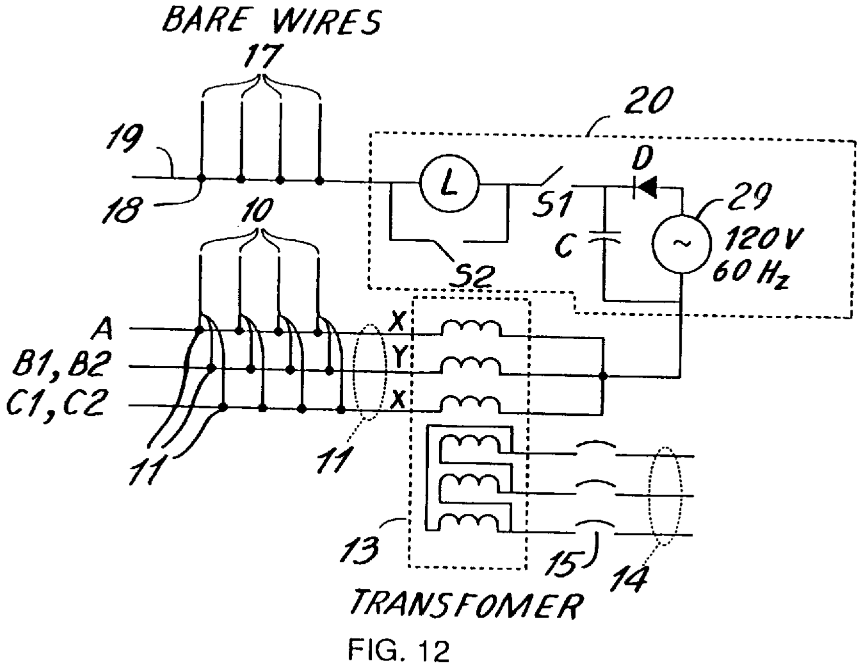
FIG. 12 is a schematic diagram of of one embodiment of the monitoring system.

FIG. 7 illustrated the essential elements of a monitoring system. FIG. 12 shows one embodiment whereby the bare sensing wires 17 running along the length of each heating cable can be used to detect the integrity of the 3-phase heating system. The bare wires 17 are connected to a single insulated conductor 19 which follows the main feeder 11 back to the monitoring device 20. The latter consists of switches S1 and S2, a lamp L, a diode D, a capacitor C and a dedicated ac source 29.

The heating wires and the bare sensing wire of each cable are contained within a plastic sheath. The sensing wire is therefore in close proximity to the heating wires. Consequently, if a cable is damaged, such as may happen if a hole is pierced in a floor, a contact will be established between the bare wire and at least one of the heating wires.

In one embodiment of the monitoring device 20, a 120 V, 60 Hz ac source 29 charges a capacitor C to a potential of about 170 V dc by means of a diode D. A lamp L is connected in series with an electronic switch S1 that closes repeatedly at intervals, say, of once per second. If the heating system is intact, the periodic application of 170 V dc between the bare wires and the heating wires will have no effect and the lamp will not light up. But if a fault or short-circuit occurs between a bare wire and any one of the heating wires in the cable, the lamp will blink repeatedly at a rate of once per second, as the capacitor discharges through the lamp into the short circuit. By an auxiliary circuit means (not shown), this action will cause circuit breaker 15 on the primary side of the transformer to trip, thus removing power from the defective heating system. Because the monitor is powered by a dedicated supply, the lamp will continue to blink, thus alerting the existence of a faulty cable.

To locate the fault, the lamp is short-circuited by means of switch S2, a procedure that greatly increases the capacitor discharge current through the fault. The resulting pulsating magnetic field created around the insulated conductor 19 and around the defective cable, can be detected by a portable magnetic pick-up. By following the path of the pulsating magnetic field, the location of the fault can be determined. It is understood that many other means, utilizing the sensing wire concept, can be devised to monitor a heating system, and to determine the location of a fault.

Star cable and single-phase source

Figure 13A:
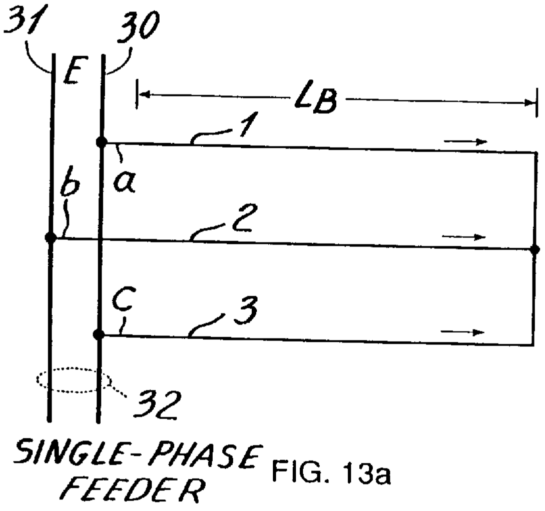
FIG. 13*a* is a schematic diagram of a star cable showing its mode of connection to a single-phase feeder.

Some heating systems are powered by a single-phase source. In such cases, the three-wire star cable normally used in 3-phase systems can be connected so that the accompanying magnetic field is particularly low. The preferred single-phase connection of a star cable is shown in FIG. 13*a*. In this Figure, connecting leads a and c of outer wires 1, 3 are connected to one busbar 30 of a single-phase feeder, while connecting lead b of inner wire 2 is connected to the other busbar 31. Leads a and c are therefore in short-circuit and a single-phase voltage E is applied to the cable.

The outer wires 1, 3 are now effectively connected in parallel, and the said parallel connection is in series with inner wire 2. The arbitrary positive directions of currents $I_A$ $I_B$ and $I_C$ that flow in the wires are shown in FIG. 13*a*. The wires have the same cross section; consequently, currents $I_A$ and $I_C$ each have magnitudes that are substantially one-half that of current $I_B$. The currents in all three wires attain their respective peak values at the same time. As a result, the maximum flux density is attained when the line current $I_B$ reaches its maximum positive (or negative) value.

Figure 13B:
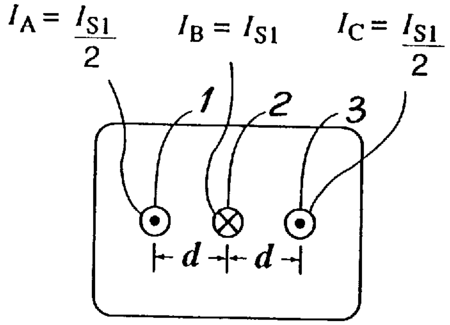
FIG. 13*b* is a cross section view of a star cable, showing the magnitude and direction of the single-phase current flows in the wires at the moment when the flux density surrounding the cable is maximum.

The actual direction and magnitude of the respective currents at one moment of maximum flux density are shown in FIG. 13*b*. Thus, the currents in outer wires 1, 3 flow out of the page, while the current in inner wire 2 flows into the page. The peak value of $I_B$ is equal to $I_{S1}$, where $I_{S1}$, is the peak line current drawn by the cable from the single-phase feeder. The subscripts S and 1 in $I_{S1}$ respectively stand for star cable and 1-phase source.

Figure 14:
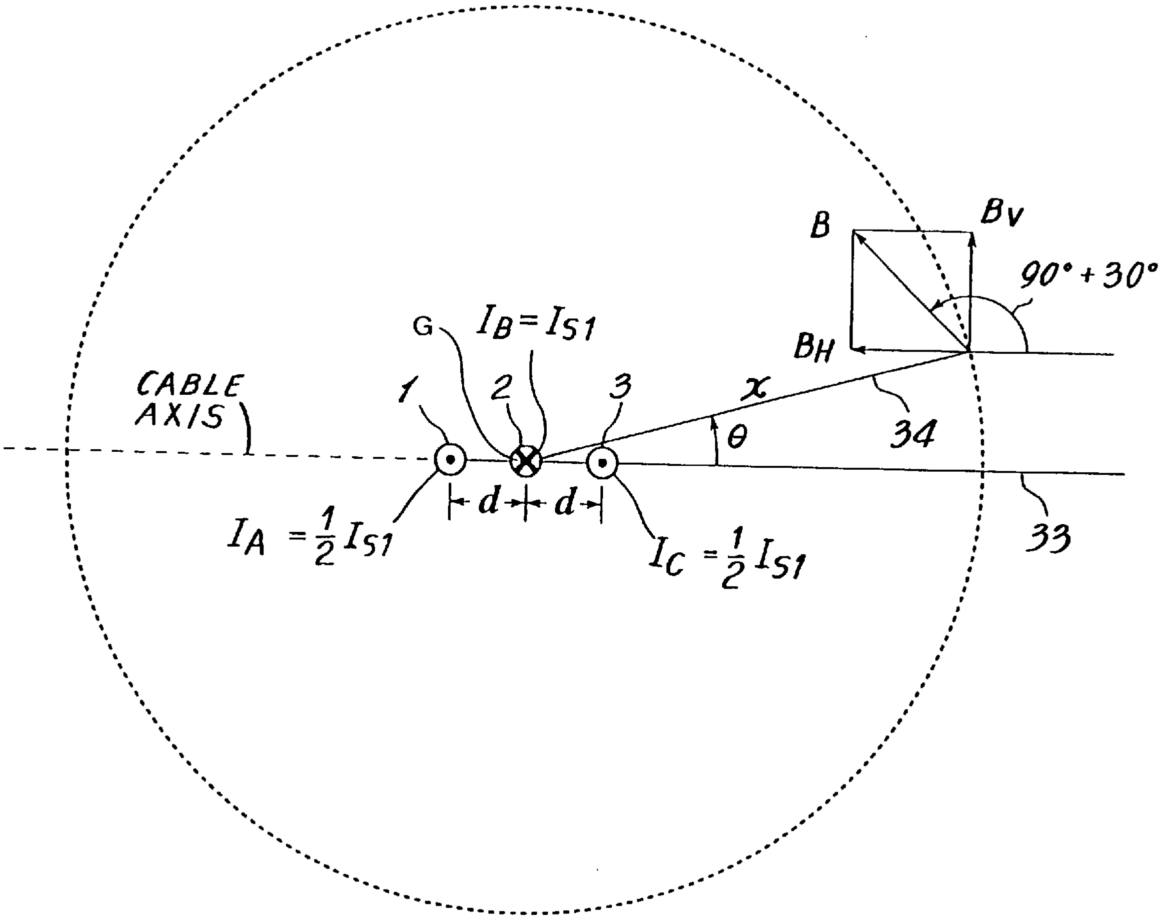
FIG. 14 is a cross section view of a star cable when connected to a single-phase source, showing the magnitude and direction of current flows in the wires and the resulting components of flux density at one point, at the moment when the flux density surrounding the cable is maximum.

An expression was derived that gives the flux density surrounding the star cable at this particular moment of peak flux density. Referring to FIG. 14, ray 33 lies on the horizontal axis of the cable, extending to the right from the geometric center G of the three wires. Consider now a ray 34 of length x, inclined at an angle θ to the horizontal axis. I have found that the maximum flux density B at this distance x is given by the approximate formula:

$$B = \frac{2 I_{S1} d^2}{x^3} \qquad (11)$$

The approximate horizontal and vertical components of this flux density are respectively:

$$B_H = B \cos (90+3\theta) \quad (12)$$

$$B_V = B \sin (90+3\theta) \quad (13)$$

where

B=maximum flux density [mG];

$I_{S1}$=peak line current drawn by the single-phase star cable [A]

d=space between adjacent wires in a row [m]

x=radial distance from the geometric center of the cable [m]

θ=angle between the horizontal axis of the cable and the ray joining its geometric center to the point of said maximum flux density [0];

90=constant angle [°].

For the current directions shown in FIG. 14, positive values of $B_H$ are directed to the right, parallel to the horizontal axis, while positive values of $B_V$ are directed upwards, in quadrature with the horizontal axis.

Figure 15:
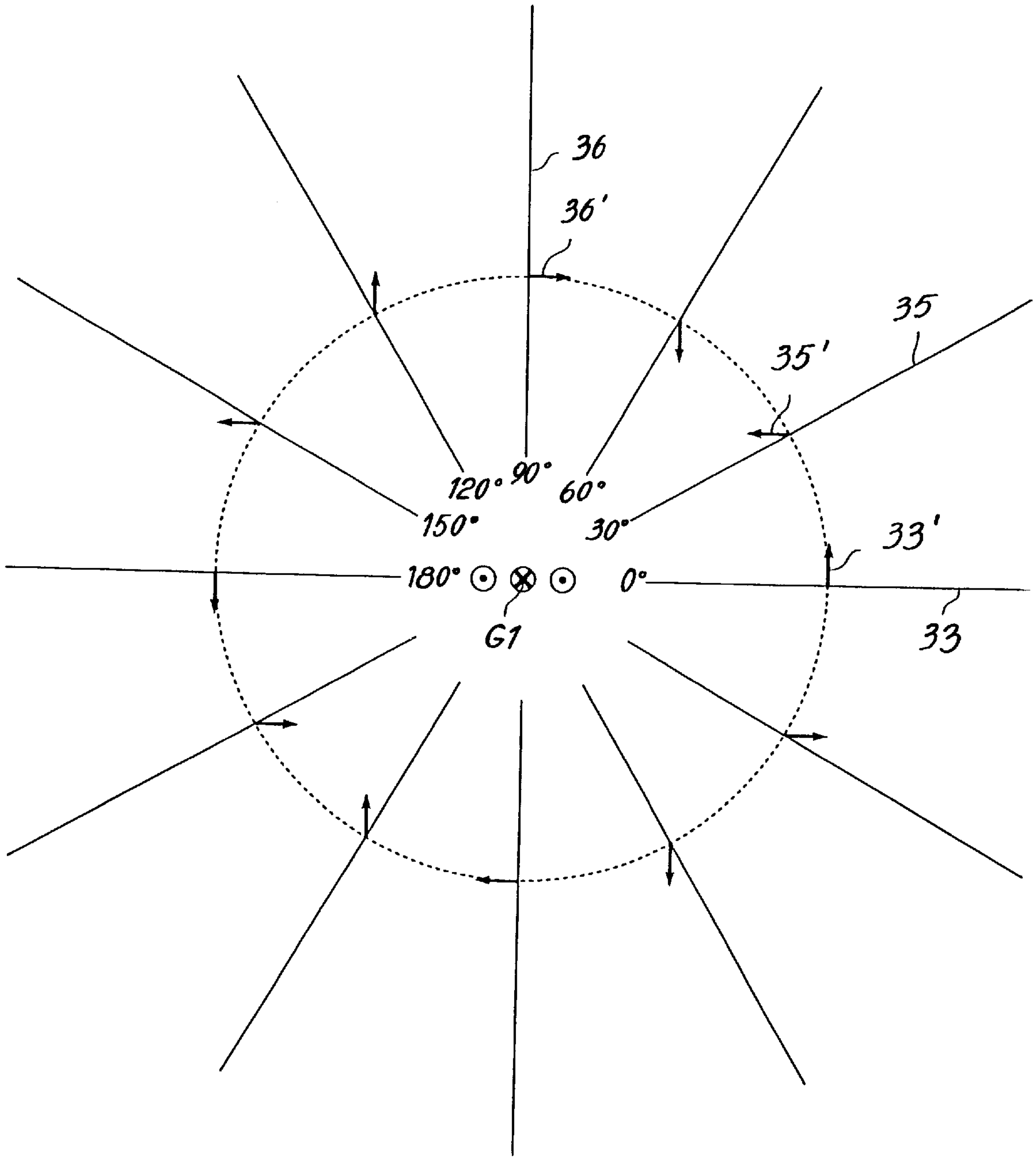
FIG. 15 is a schematic drawing showing the flux density pattern surrounding a star cable when connected to a single-phase source.

FIG. 15 shows in greater detail the nature of the flux density pattern surrounding the cable. A set of hypothetical rays, centered at $G_1$ and spaced at intervals of 30°, are superposed on the three-wire cable. The flux density orientation associated with each ray is shown by a short arrow. Consider, for example, ray 35 that is inclined at 30° to the horizontal axis. The horizontal component $B_H$ associated with this ray is $B_H$=B cos (90°+3×30°)=B cos 180°=−B, directed to the left. On the other hand, the vertical component $B_V$=B sin (90°+3×30°)=B sin 180°=0.

Thus, the flux density vectors at every point along ray 35 are directed horizontally to the left, as indicated by representative flux density vector 35'. By a similar reasoning, the representative flux density vector 36' is directed horizontally to the right at every point along vertical ray 36, because this ray is inclined at 90° to the horizontal axis.

Equation (11) reveals that the flux density decreases inversely as the cube of the distance from the geometric center G. Thus, the flux density decreases very rapidly with increasing x. The magnitude of the flux density also depends upon the fixed spacings d between the wires; the closer the spacing the lower the flux density. To obtain the results predicted by Eqs. (11), (12) and (13) it is essential that the wires (and the currents they carry) be configured as described above.

Cable configuration (single-phase source)

When heating a surface area, the cable configuration has an important effect on the resulting flux density. In a single-phase heating system, proper cable configuration means that the horizontal axes of the cables are coplanar and lie substantially parallel to the plane of the surface to be heated.

Proper cable configuration also comprises the proper instantaneous direction of current flow in successive cable runs at the instant when the flux density is maximum. We recall (FIG. 13*b*) that the maximum flux density of each cable occurs when the current in the inner wire is instantaneously at its peak. The currents in the outer wires flow in the opposite direction to that in the inner wire and have respectively half its magnitude.

FIG. 16*a* is a cross section view of a portion of a heated surface, fed by a single-phase source, showing four representative adjacent cable runs wherein the currents in the inner wires are momentarily at their peak. In this Figure, as regards cable runs, the magnitudes and directions of the currents flowing in correspondingly-located wires are respectively the same. Thus, currents $I_{A1}$, $I_{A2}$, $I_{A3}$, $I_{A4}$, flowing in the outer wires on the left-hand side of each run are substantially equal, and flow in the same direction, out of the paper. Similarly, currents $I_{C1}$, $I_{C2}$, $I_{C3}$, $I_{C4}$, flowing in the outer wires on the right-hand side of each run are substantially equal and flow in the same direction, out of the paper. Finally, currents $I_{B1}$, $I_{B2}$, $I_{B3}$, $I_{B4}$, flowing in the inner wires of each run are substantially equal, and flow in the same direction, into the paper. For purposes of ready identification, I call this a single-phase similar-flow configuration.

On the other hand, FIG. 16*b* is a cross section view of a portion of yet another heated surface showing four representative adjacent cable runs wherein the currents in the inner wires are again momentarily maximum. However, as regards the cable runs, the direction of current flows in correspondingly-located wires of successive cable runs are alternately opposite. Thus, currents $I'_{A1}$, $I'_{A2}$, $I'_{A3}$, $I'_{A4}$, flowing in the outer wires on the left-hand side of each run are substantially equal in magnitude, but flow alternately in opposite directions. Similarly, currents $I'_{C1}$, $I'_{C2}$, $I'_{C3}$, $I'_{C4}$, flowing in the outer wires on the right-hand side of each run are substantially equal in magnitude, but flow alternately in opposite directions. Finally, currents $I'_{B1}$, $I'_{B2}$, $I'_{B3}$, $I'_{B4}$, flowing in the inner wires of each run are substantially equal in magnitude, but also flow alternately in opposite directions. For purposes of ready identification, I call this an alternate-flow single-phase configuration.

Single-phase alternate-flow and similar-flow configurations have an important impact on the resultant flux density above a heated surface.

Flux density above a heated surface area (single-phase source)

Figure 17:
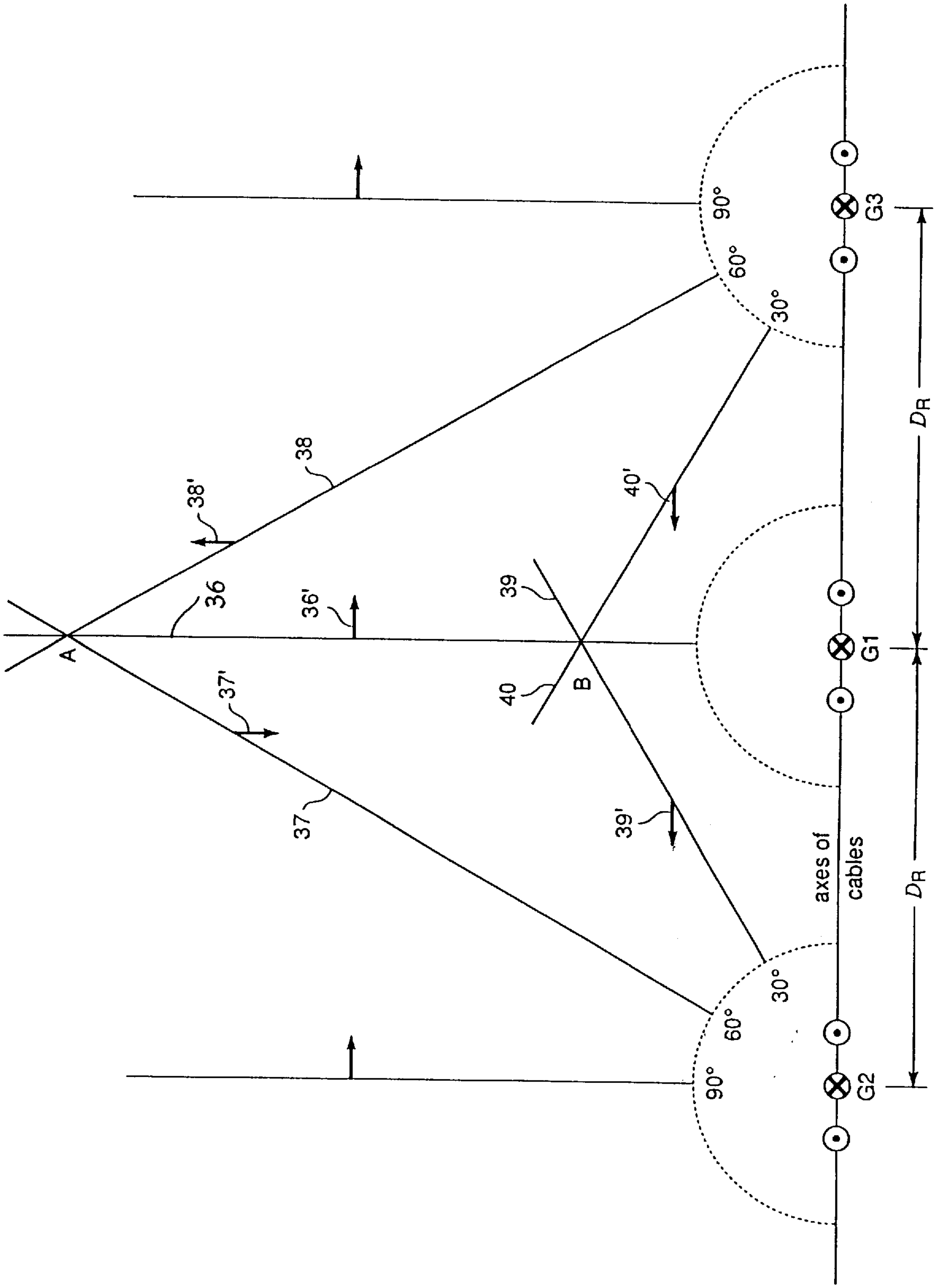
FIG. 17 is a schematic diagram showing in cross section a similar-flow configuration of three adjacent cable runs, laid out on a flat surface, when the star cables are connected to a single-phase source, together with representative flux density patterns.

FIG. 17 shows, in cross section, three adjacent cable runs $G_1$, $G_2$, $G_3$, whose geometric centers are also labeled $G_1$, $G_2$, $G_3$. The cable runs are laid out on a flat surface and spaced at a distance $D_R$. The cables are powered by a single-phase source and their flux density patterns are similar to the pattern illustrated in FIG. 15. In effect, the cables are laid out and configured in such a way that their horizontal axes are coplanar and lie parallel to the plane of the heated surface, as shown in FIG. 17. Furthermore, the cables are arranged so that the magnitudes and directions of current flows in correspondingly-located wires of adjacent cable runs are substantially the same. The cable configuration is therefore of the single-phase similar-flow type.

In order to visualize the nature of the resulting magnetic field, we assume that rays, spaced at 300 intervals, fan out from the respective geometric centers $G_2$, $G_3$. Let us examine the resultant flux densities immediately above cable $G_1$. We recall that the vertical ray 36 emanating from $G_1$ is associated with flux density vectors that are directed horizontally to the right, as exemplified by flux density vector 36'.

Consider first the rays 37 and 38, respectively inclined at 60° and 120° to the horizontal, that intersect at point A. Their associated magnetic fields act vertically, but in opposite directions, as illustrated by flux density vectors 37' and 39'. At point A, the flux densities are equal in magnitude (and therefore cancel out) because the distances $AG_2$ and $AG_3$ are the same.

Consequently, the resultant flux density at point A is that due to cable $G_1$ alone. The flux density vector at this point is therefore directed to the right. Point A is at a height $H=D_R \tan 60° = \sqrt{3}\, D_R$ or about 1.7 times $D_R$ above the horizontal axes of the cables, and perpendicular thereto.

Next, consider rays 39 and 40, respectively inclined at 30° and 150° to the horizontal axis, that intersect at point B. Both rays are associated with flux densities 39' and 40' that act to the left, in direct opposition to the flux density created by cable $G_1$. Consequently, the net flux density at point B is less than that created by cable $G_1$. It is now seen that the flux density at every point along the line between points A and $G_1$ is less than that produced by $G_1$ alone.

However, in this simple model of FIG. 17, it can be shown that the flux densities at every point along ray 36 above point A will be greater than that due to cable $G_1$ alone. This is not a serious drawback because point A is located at a distance of 1.7 $D_R$ above the surface, which is so far away from the cables that the flux density is already low.

If cable $G_1$ is surrounded by several additional cable runs on either side, the resulting flux density will be reduced still more in the general region between points A and $G_1$. However, for heights very close to $G_1$ (say, H=2d), the flux-reducing effect of surrounding cable runs is small.

It is understood that when several cable runs are involved, a detailed flux density analysis can be made, either by employing Eqs. (11), (12) and (13), or by computer simulation. However, the basic factors that come into play are easier to visualize by referring to FIG. 17.

In conclusion, the single-phase similar-flow configuration of FIG. 17 is a preferred embodiment of this invention because it tends to reduce the flux density in the regions near the heated surface, namely those situated at heights H below 1.7 $D_R$, perpendicular to the horizontal axes of the cables.

Conversely, if an alternate-flow configuration is employed, the flux densities tend to be greater than those due to a single cable, in the regions situated at heights H below 1.7 DR. This is demonstrated in reference to Example 4 in the section entitled Examples and Test Results.

The question of cable configuration is particularly important in single-phase heating systems when the star cables each comprise two or more contiguous runs. In effect, it is then impossible to obtain the single-phase similar-flow configuration shown in FIG. 17. The reason is that adjacent contiguous cable runs inherently produce an alternate-flow configuration. Thus, if the flux density close to the heated surface area has to be kept as low as possible, the cables must be restricted to a single run, in order to obtain the desired similar-flow configuration.

In the event that a single-run per cable configuration is not feasible, and two or more cable runs per cable must be used, I have found that the resulting maximum flux density $B_{max}$ at heights H less than 1.7 $D_R$ is no greater than 1.5 times the maximum flux density created by one cable alone, at that height. Applying this finding to Eq. (11) yields the formula:

$$B_{max} = \frac{3 I_{S1} d^2}{H^3} \qquad (14)$$

in which H≦1.7 $D_R$ and $I_{S1}$ and d have the same significance as before.

Cable parameters and characteristics

In addition to low flux densities, the heating cables must meet the requirements listed in the objectives of this invention. Thus, they must be robust, operate at temperatures below 90° C., and be as long as possible in order to reduce the number of cables that have to be connected to the feeder. Another objective is that the cables should be standardized as to wire size, wire material, and wire configuration so that a particular type of cable may be used in different heating installations. In order to meet these objectives and to evaluate the interaction of the various requirements, we postulate the parameters listed in Table 2. They are common to the two cable applications revealed in this disclosure (3-phase star, single-phase star).

Using these parameters, the features of each cable can be analyzed and compared. In making the comparison, we assume that the line-to-line operating voltage E, the thermal power per unit length $P_C$, and the total

TABLE 2

| Parameter | symbol | unit |
|---|---|---|
| Line-to-line operating voltage of heating system: | E | volt [V] |
| Thermal power density of heating system: | $P_D$ | watt per square metro [W/m²] |
| Thermal power per unit length of cable: | $P_C$ | watt per meter [W/m] |
| Length of cable: | L | meter [m] |
| Total cross section of all wires in the cable | A | square meter [m²] |
| Resistivity of wire material: | ρ | ohm-meter [Ω.m] |

cross section A of the current-carrying wires are the same for both types of cables. We begin our analysis of the 3-phase star cable illustrated in FIG. 2. We reason as follows:

$$\text{cross section of one wire} = \frac{A}{3}$$

$$\text{length of cable} = L_A$$

$$\text{length of wire for one phase:} = L_A$$

$$\text{resistance of wire for one phase: } R = \frac{\rho L_A}{A/3} = \frac{3\rho L_A}{A}$$

$$\text{total heating power of cable} = \frac{E^2}{R} = \frac{E^2 A}{3\rho L_A}$$

$$\text{thermal power per unit length} = \frac{E^2 A}{3\rho L_A^2} = P_C$$

$$\text{length of cable} = L_A = \frac{E}{\sqrt{3}}\sqrt{\frac{A}{\rho P_C}} = 0.577E\sqrt{\frac{A}{\rho P_C}}$$

$$\text{RMS*line current} = \frac{P_C L_A}{E\sqrt{3}} = \frac{1}{3}\sqrt{\frac{A P_C}{\rho}} = 0.333\sqrt{\frac{A P_C}{\rho}}$$

*RMS = root mean square $$\text{spacing } D_R \text{ between cable runs} = \frac{P_C}{P_D}$$

$$\text{Let us define the amperage parameter } I_0 = \sqrt{\frac{A P_C}{\rho}}$$

(We use the amperage parameter to show with greater clarity the relative magnitudes of the line currents and flux densities). RMS line current=0.333 $I_0$ Peak line current $I_{S3}$=√2 (0.333 $I_0$)=0.471 $O_0$ $$\text{Peak flux density} = \frac{2\sqrt{3}\, I_{S3} d}{x^2} = \frac{1.633 I_0 d}{x^2} = \frac{1.633 d}{x^2}\sqrt{\frac{A P_C}{\rho}}$$

By following the same procedure, the features of the star cable can be found when connected to a single-phase system (FIG. 13). The features are listed in Table 3.

TABLE 3

| Type of cable | star | | star |
|---|---|---|---|
| (1) source | 3-phase | | 1-phase |
| (2) length of cable | $0.577E\sqrt{\frac{A}{\rho P_c}}$ | | $0.471E\sqrt{\frac{A}{\rho P_c}}$ |
| (2) length of cable | $L_A$ | | $L_B$ |
| (3) wires per cable | 3 | | 3 |
| (4) wire cross section | $\frac{A}{3}$ | | $\frac{A}{3}$ |
| (5) RMS line current | 0.333 $I_O$ | | 0.471 $I_O$ |
| (6) peak line current | 0.471 $I_O$ | | 0.666 $I_O$ |
| (7) peak line current | $1_{S3}$ | | $I_{S1}$ |
| (8) power per unit length | $P_c$ | | $P_c$ |
| (9) peak flux density | $\frac{3.46 I_{S3}\, d}{x^2}$ | | $\frac{2\, I_{S1}\, d^2}{x^3}$ |
| (10) peak flux density | $\frac{1.63 I_0\, d}{x^2}$ | note: $I_0 = \sqrt{\frac{AP_c}{\rho}}$ | $\frac{1.33 I_0\, d^2}{x^3}$ |
| (11) Figure | FIG. 2 | | FIG. 13 |

Choice of wire material and individual cable length

Table 3, row (2), reveals that the length of individual cables depends on E, A, $P_C$ and ρ, multiplied by a numerical coefficient that depends upon the type of source, i.e. three-phase or single-phase.

To ensure robustness, the total cross section A of the three wires should not be too small. Typical values for surface heating range from 5 $mm^2$ to 10 $mm^2$. However, for special applications, smaller or larger values can be employed. The voltage E is low, being 30 V or less. Consequently, according to the formulas in row (2), the cable lengths tend to be short, which is a disadvantage. The question now arises as to what values of $P_C$ and ρ should be used.

In any given surface-heating project requiring a total power P, the total length of all the heating cables is equal to P/PC . In order to minimize the cost, this total length should be as small as possible, which means that $P_C$ should be as large as possible. However, the value of $P_C$ is limited to a maximum $P_{Cmax}$ that depends upon the maximum allowable temperature of the cable as well as the environmental conditions, such as the ambient temperature and the emplacement of the cables.

For a given cable having a total wire cross section A there is a corresponding $P_{Cmax}$, as defined above, no matter what conductive material is used for the wires. Thus, given the total cross section A and knowing the value of $P_{Cmax}$ and recognizing that E has an upper limit of 30 V, it follows from the formulas in Table 3, row (2), that to obtain the longest possible individual cable, the resistivity ρ of the material should be as low as possible. Copper has the lowest resistivity of all practical conducting materials and so it is a logical choice. However, aluminum is also a satisfactory choice.

However, having chosen the wire material and the total cross section A, the length of the individual cables can still be tailored to a desired value by using an appropriate value for $P_C$ and a voltage E that is 30 V or less. The ability to tailor the individual cable lengths is important because surface-heating systems are preferably composed of runs of equal length, such as shown in FIG. 6.

These findings regarding the appropriate wire material and cable lengths constitute a further aspect of this invention.

EXAMPLES AND TEST RESULTS

The following examples and test results illustrate some of the characteristics of the extra-low-voltage heating systems covered by this disclosure.

Example 1

A three-conductor No. 14 AWG gauge cable was embedded in a concrete slab and then subjected to snow-melting conditions. It was discovered that a current of 42 A could be circulated through the wires without exceeding the temperature limit of 60° C. This test corresponds to a thermal power of 50 watts per meter.

As a general rule, our experiments on typical low-voltage systems indicate that $P_c$ can range between 20 W/m and 50 W/m depending upon the type of cable, the ambient temperature and the emplacement of the cable. As regards $P_D$, it ranges from 100 $W/m^2$ (10 $W/ft^2$) for room heating to 500 $W/m^2$ (50 $W/ft^2$) for snow melting. As result, the cable spacings $D_R$ will typically range from 0.1 m (4 in) to 0.2 m (8 in).

Example 2

It is required to calculate the length of a 3-phase star cable composed of three copper wires, No. 14 AWG, knowing that the temperature is limited to a maximum of 60° C. The line voltage is 30 V and the desired thermal power $P_c$ is 25 W/m. The resistivity of copper at 60° C. is 20 nΩ.m and the cross section of the individual wires is 2.08 $mm^2$.

The length can be found by referring to the star cable in the first column, row (2) of Table 3:

$$\text{Length} = 0.577E\sqrt{\frac{A}{\rho P_C}}$$

$$= 0.577 \times 30\sqrt{\frac{3 \times 2.08 \times 10^{-6}}{20 \times 10^{-9} \times 25}}$$

$$= 61.1\ \text{m}(= 200\ \text{ft})$$

Example 3

Figure 18A:
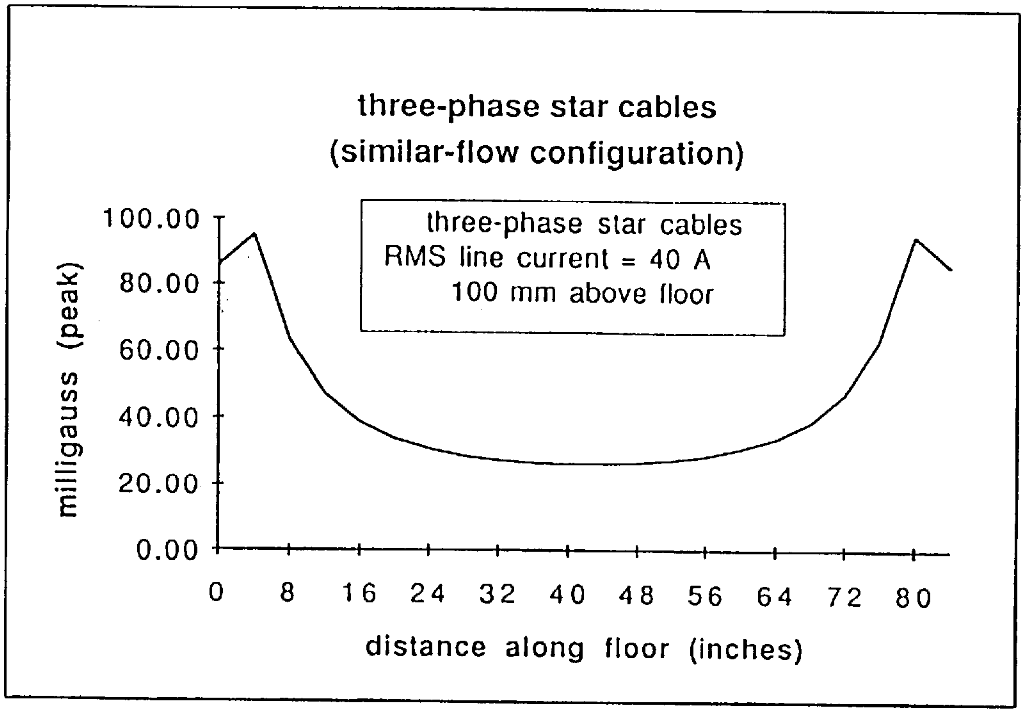
FIG. 18*a* shows the magnetic flux density distribution above a heated floor when the star cables are connected to a 3-phase source, in a similar-flow configuration.

FIG. 18*a* shows the flux distribution above a long, narrow floor that is 84 inches wide and heated by twenty cable runs spaced at 4 inch intervals. The first cable run is located 4 inches from the left-hand edge of the floor and the twentieth cable run is 4 inches from the right hand edge. The heating system has the following specifications:

| | |
|---|---|
| Power source | 3-phase, 30 V |
| number of cable runs | 20 |
| type of cable | star cable |
| RMS line current per cable | 40 A |
| cable specifications: (see FIG. 2b) | d = 5 mm |
| cable configuration | similar-flow (3-phase) |
| spacing $D_R$ between cable runs (FIG. 6): | 101.6 mm (4 inches) |
| height H above coplanar axes of cables: | 100 mm |

FIG. 18*a* shows that at a height H of 100 mm (≈4 in), the flux density is less than 40 mG over most of the width of the floor and rises to about 90 mG at the edges. The flux distribution was obtained by computer simulation, based on Eq. (1).

By way of comparison, the peak flux density created by a single cable run at a distance of 100 mm from its geometric center can be calculated by using Eq (7). Recognizing that the peak line current is $I_{S3}=40\sqrt{2}=56.6$ A, it is found that the maximum flux density is:

$$B = \frac{3.46 I_{S3} d}{x^2} = \frac{3.46 \times 56.6 \times 0.005}{0.1^2} = 98 \text{ mG} \qquad \text{Eq. 7}$$

This individual-cable flux density is more than double the 40 mG that appears over most of the floor at a height H of 100 mm. Consequently, it is evident that the 3-phase similar-flow configuration, revealed in the disclosure, constitutes an important and beneficial factor in reducing the flux density above a heated floor.

Note that the height of 100 mm falls within the prescribed range $H<D_R$, i.e. H<101.6 mm, wherein the flux density is reduced, as predicted in the disclosure.

Figure 18B:
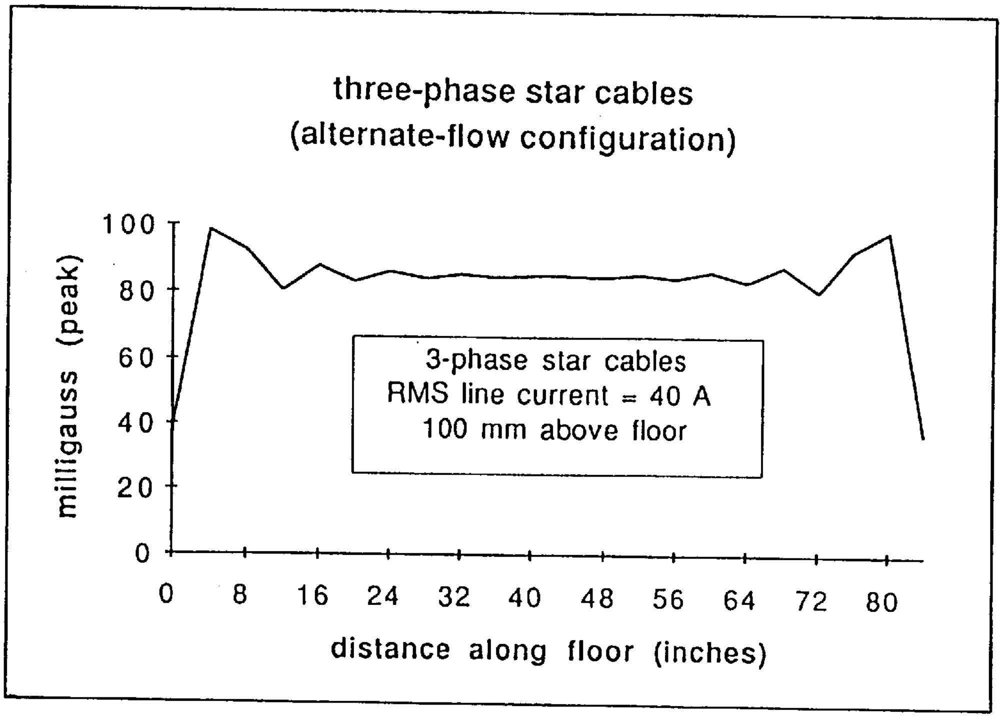
FIG. 18*b* shows the magnetic flux density distribution above a heated floor when the star cables are connected to a 3-phase source, in an alternate-flow configuration.

To show the advantage of using the similar-flow configuration, FIG. 18*b* shows the flux density at a height of 100 mm above the plane of the cables when the 3-phase alternate-flow configuration is employed. The flux density is now close to 90 mG over most of the width of the heated surface area, as compared to the 40 mG level seen in FIG. 18*a*.

Example 4

Figure 19A:
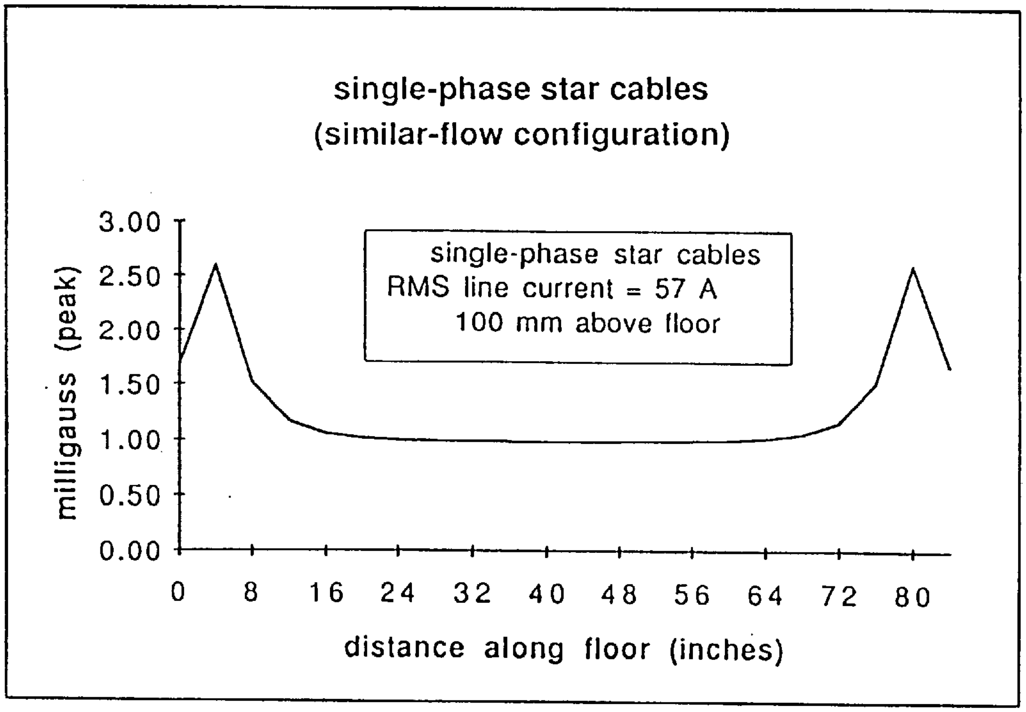
FIG. 19*a* shows the magnetic flux density distribution above a heated floor when the star cables are connected to a single-phase source in a similar-flow configuration.

FIG. 19*a* shows the flux distribution above the same floor as in Example 3 except that the power source is single-phase and the star cables are connected accordingly, as shown in FIG. 13. All the cables are assumed to have single runs, and are connected to the feeder to produce a single-phase similar-flow configuration.

To obtain the same power per unit length $P_C$ as in Example 3, the single-phase RMS line current is set at (0.471/0.333)×40=57 A. This result is calculated by using the formulas listed in Table 3, row (5). The current is set to 57 A by tailoring the length of the cable and, if necessary, by adjusting the line voltage E.

FIG. 19*a* shows that at a height of 100 mm (≈4 in), the maximum flux density is approximately 1 mG over most of the width of the floor and rises to about 2.5 mG at the edges. The flux distribution was obtained by computer simulation, based on Eq. (1).

Again by way of comparison, the peak flux density created by a single cable at a distance x of 100 mm from its geometric center can be calculated by using Eq (11). The peak line current is $I_{S1}=57\sqrt{2}=80.6$ A, and therefore the peak flux density is:

$$B = \frac{2 I_{S1} d^2}{x^3} = \frac{2 \times 80.6 \times (0.005)^2}{0.1^3} = 4 \text{ mG} \qquad \text{Eq. 12}$$

This individual-cable flux density is 4 times greater than the 1 mG that appears over most of the floor at a height H of 100 mm. Consequently, the single-phase similar-flow configuration, as postulated in the disclosure, is a beneficial factor in reducing the flux density above a heated floor.

The height of 100 mm falls within the prescribed range, $H<1.7\ D_R$, i.e. H<1.7×101.6=173 mm, revealed in the disclosure, wherein the flux density is reduced.

Figure 19B:
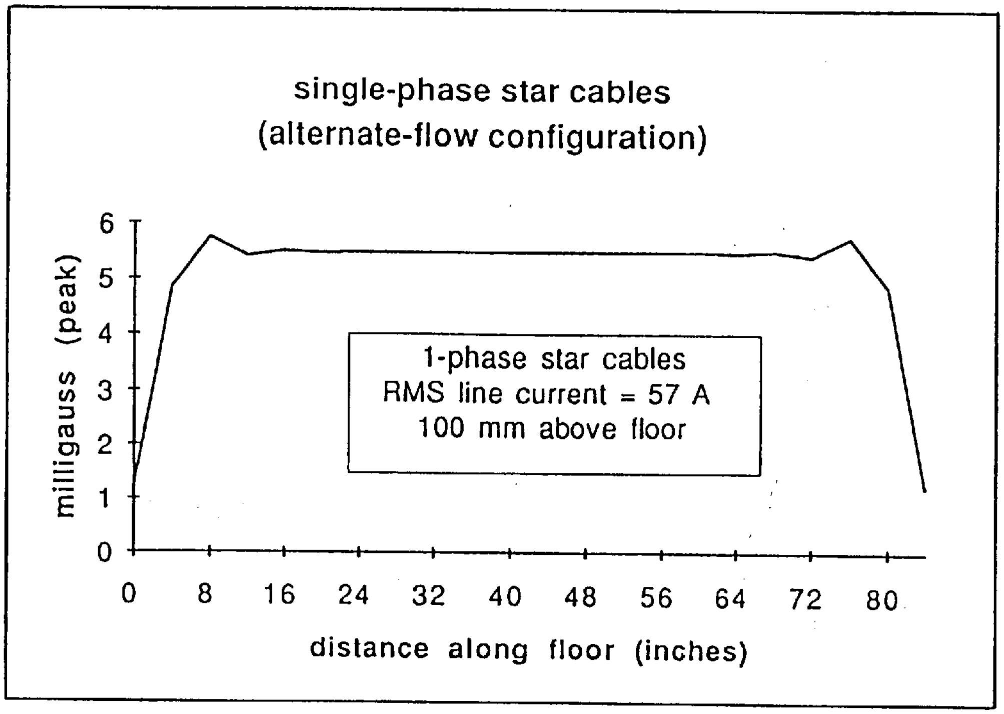
FIG. 19*b* shows the magnetic flux density distribution above a heated floor when the star cables are connected to a single-phase source in an alternate-flow configuration.

If the single-phase heating system has cables comprising two or more contiguous cable runs, the resulting alternate-flow configuration produces the flux density profile shown in FIG. 19*b*. Note that the flux density is now much higher than in FIG. 19*a*, being 5.5 mG over most of the surface heating area. However, as predicted by Eq. (14), this flux density is less than $B_{max}$ given by:

$$B_{max} = \frac{3 I_{S1} d^2}{H^3} = \frac{3 \times 80.6 \times 0.005^2}{0.1^3} = 6 \text{ mG} \qquad \text{Eq. 14}$$

Magnetic field produced by single-phase feeder

We have seen (FIG. 19) that the magnetic flux density above a surface area heated by a group of single-phase star cables can be quite small. However, this weak field may be overwhelmed by the strong magnetic field surrounding the feeder that supplies power to the cables.

Figure 20:
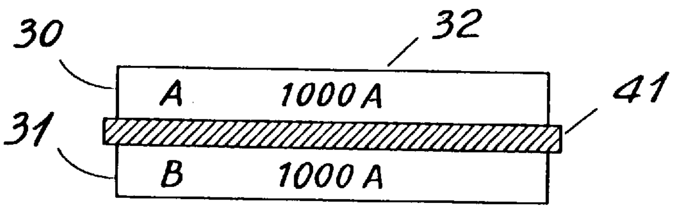
FIG. 20 (PRIOR ART)
FIG. 20 is a cross section view of a single-phase feeder of the prior art.

FIG. 13*a* shows a portion of a heating system wherein a conventional single-phase feeder 32, delivers power to one of a plurality of star cables distributed along its length. As the current builds up along the length of the feeder, the busbars 30, 31 may eventually carry peak currents of several hundred amperes at points near the step-down transformer. This creates a problem as far as the magnetic field surrounding the feeder is concerned. The feeder 32 is usually composed of two busbars, traditionally stacked as shown in FIG. 20, which is a cross section view. A thin strip of insulation 41 separates the respective busbars 30, 31, labeled A, B.

In this Figure, for purposes of illustration, suppose each copper bar is 48 mm (2 in) wide and 12 mm (0.5 in) thick, separated by an insulating strip of 3 mm. Such a feeder can carry an RMS (root mean square) current of about 1000 A. When the peak current delivered by the transformer is 1000 A, the feeder produces the approximate peak flux densities shown in Table 4, wherein the values were obtained by computer simulation. Distances are measured from the geometric center of the feeder.

Figure 21:
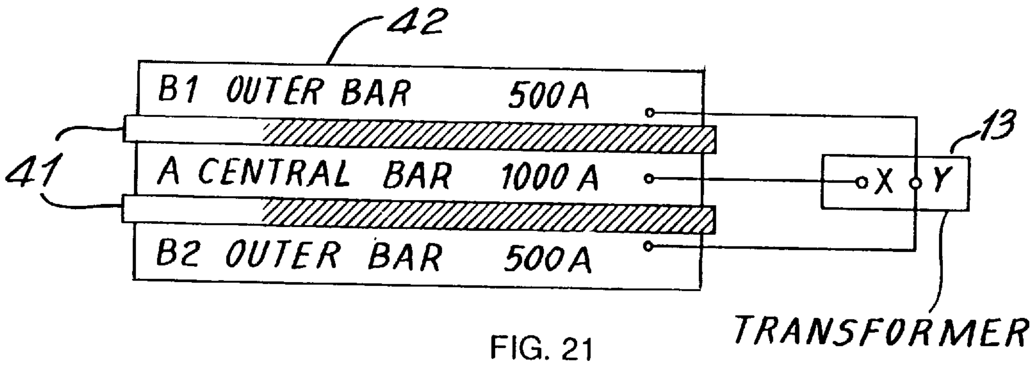
FIG. 21 is a cross section view of a special single-phase three-bar feeder that is part of this invention.

These flux densities are too high if television screens are located closer than about 40 inches from the transformer end of the feeder. For this reason, a special feeder, producing a lower flux density, is desirable for this low-voltage single-phase heating system. FIG. 21 shows a cross section view of this special feeder, which has three copper bars instead of two. In effect, the current formerly carried by busbar B is now carried by two outer bars B1, B2 having half the thickness of the original busbar.

TABLE 4

| Two busbar configuration | | |
|---|---|---|
| distance from feeder | | flux density |
| mm | inches | milligauss |
| 100 | 4 | 3000 |
| 250 | 10 | 480 |
| 500 | 20 | 120 |
| 1000 | 40 | 30 |

The copper bars are stacked in a special way, as shown in FIG. 21, with central bar A sandwiched between outer bars B1 and B2.

Figure 22:
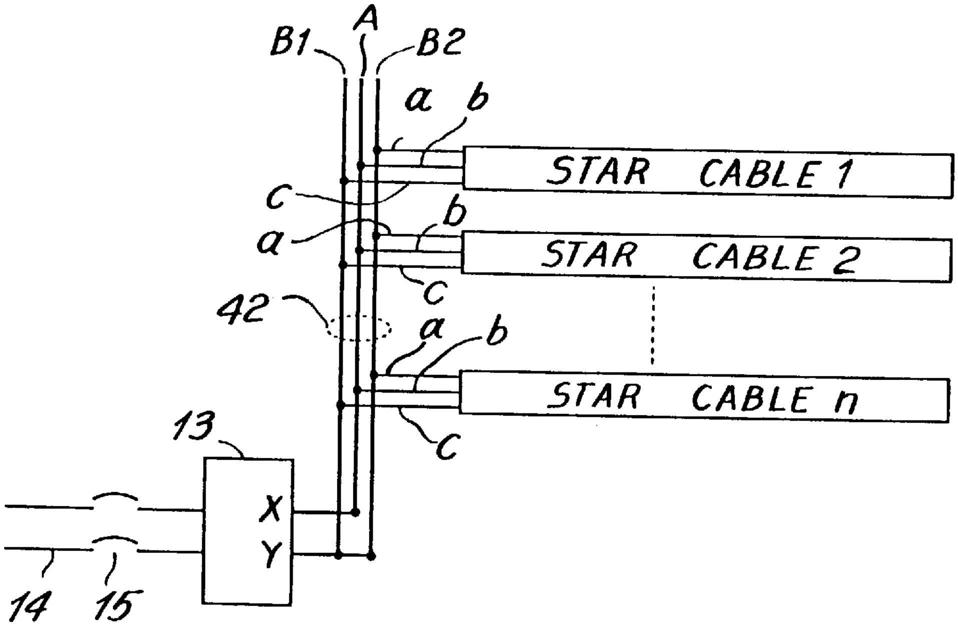
FIG. 22 is a schematic diagram of a single-phase heating system using a three-bar feeder, and showing the method of connecting the star heating cables thereto.

FIG. 22 shows that at one end of the feeder, bars B1, B2 are connected to terminal Y of transformer 13, and bar A is connected to terminal X. This three-bar configuration produces the flux densities shown in Table 5, when the peak single-phase current delivered by the transformer is again 1000 A.

TABLE 5

| Three-bar configuration | | |
|---|---|---|
| Distance from feeder | | Flux density |
| mm | inches | milligauss |
| 100 | 4 | 300 |
| 250 | 10 | 18 |
| 500 | 20 | 2.2 |
| 1000 | 40 | 0.3 |

As compared to Table 4, it is evident that the 3-bar configuration reduces the flux density to an acceptable value for TV screens that are 10 inches away from the feeder. However, to obtain this result, the RMS currents carried by each of the outer bars must be one-half the RMS current carried by the central bar. Ideally, this condition should be met at every given common point along the length of the feeder, in order to minimize the flux density surrounding the feeder at that point.

To approach this ideal condition, FIG. 22 shows how the heating cables are connected to the three-bar feeder 42. The connecting lead of the inner wire of each cable is connected to the central busbar. The connecting leads of the outer wires on the left-hand side and right-hand side of each cable are respectively connected to busbars B1 and B2. This ensures substantially equal RMS currents in bars B1, B2, at any given point along the feeder. Furthermore, the special configuration of the star cables (FIG. 13*a*) ensures that the current in the central bar is substantially twice that in the outer bars.

The present invention includes this special single-phase feeder as part of the extra-low-voltage heating system.

It is within the ambit of the present invention to cover any obvious modifications of the examples of the preferred embodiment described herein, provided such fall within the scope of the appended claims.

I claim,:

1. An extra-low-voltage heating system for heating a surface area, said system comprising at least one cable having three conductive heating wires contained in an insulated sheath, an adequate supply source of 30 volts or less, feeder conductor means connected to said supply source, said heating wires being connected at one end to said feeder conductor means, said wires having low resistivity similar to that of copper, said at least one cable and said wires therein being permanently fixed in a parallel run configuration relative to said surface area to be heated; said three heating wires of said cable being arranged in a row, said cable being of substantially rectangular cross-section with said row lying on a horizontal axis of said cable, an outer one of said three wires on a left-hand side of said row is separated from an inner one of said three wires of said row by a distance d, as measured from a center of said wires, an outer one of said three wires on a right-hand side of said row is separated from an inner one of said three wires of said row by a distance d, as measured from a center of said wires, said three heating wires being connected together at a far end of said cable, and wherein a conductive extension of each of said three wires at a near end of said cable constitute connecting leads of a star cable, said connecting leads containing a marking to identify their respective conductive extension to said right-hand side wire, said left-hand side wire and said inner wire of said row of said star cable, said surface area being a surface forming material having a surface to be heated by said cables, and a plurality of said cables being oriented and retained in cable runs disposed in parallel relationship to one another in a common plane and at a predetermined distance $D_R$ between each other, said distance $D_R$ between adjacent cable runs of said plurality of cables being given by the formula $$D_R=P_C/P_D$$

wherein $D_R$ is expressed in meters, $P_D$ is the desired heating power density expressed in watts per square meter, and $P_C$ is said desired thermal power per unit length of said cable, expressed in watts per meter, said cable having a length (L) based on specific parameters of said system including (i) the operating voltage (E) of said supply source, (ii) the number of phases of said supply source, (iii) the total cross sectional dimension (A) of said three heating wires, (iv) the resistivity (ρ) of the wire material, and (v) the desired thermal power per unit length ($P_C$) of said cable, whereby the resultant flux density at a given distance H perpendicular to the plane of said horizontal axes of said cables, is less than a specific value B when current is applied to said heating wires in said cables, specific value B being calculated from a set of parameters including said distance d between the wires, the total cross section A of all said wires in said cable, the said thermal power per unit length $P_C$ of said cable, the said resistivity ρ of the wire material and wherein said distance H is less than a specific multiple of said distance $D_R$.

2. An extra-low-voltage heating system in accordance with claim 1, wherein said system is a three-phase system, said voltage supply source having a 3-phase step-down transformer provided with three secondary terminals between which exists a line-to-line voltage which is said supply source of 30 volts or less, said secondary terminals being connected to three busbars constituting said feeder conductor means.

3. An extra-low-voltage heating system in accordance with claim 2, wherein said connecting leads of said plurality of said star cables are respectively connected to one of said three busbars, said horizontal axis of each said cables being substantially coplanar, wherein to heat said surface area.

4. An extra-low-voltage heating system in accordance with claim 3, wherein each said star cable comprises two or more contiguous cable runs, with loop ends of adjacent ones of said contiguous cable runs being folded so that currents flowing in correspondingly-located outer wires of said contiguous cable runs have the same magnitudes and directions at an instant when a current in said inner wire of said cable is zero.

5. An extra-low-voltage heating system in accordance with claim 4, wherein said resultant magnetic flux density B is measured approximately in a middle of said surface area at a distance H perpendicular to said horizontal axes of said star cables, and wherein said distance H is less than said distance $D_R$.

6. An extra-low-voltage heating system in accordance with claim 5, wherein said resultant magnetic flux density B has a said specific value no greater than that given by a three-phase similar-flow configuration formula;

$$B = \frac{1.63d\sqrt{\frac{AP_C}{\rho}}}{H^2}$$

wherein the symbols carry the following units; d and H in meters, A in square meters, $P_C$ in watts per meter, ρ in ohm-meters and B in milligauss, and wherein said d is the distance between adjacent wires in said row, A is the total cross section of all said three wires, $P_C$ is the thermal power per unit length of cable, ρ is the resistivity of the wire material and said distance H is perpendicular to the plane of said horizontal axes of said star cables and is less than said distance $D_R$.

7. An extra-low-voltage heating system in accordance with claim 1, wherein said system is a single-phase system, said voltage supply source having a single-phase step-down transformer provided with two secondary terminals between which exists a line-to-line voltage which is said power supply of 30 volts or less, said secondary terminals being connected to two busbars constituting said feeder conductor means.

8. An extra-low-voltage heating system in accordance with claim 7, wherein said connecting leads of said plurality of said star cables are respectively connected to one of said two busbars, said horizontal axis of each said cables being substantially coplanar, wherein to heat said surface area.

9. An extra-low-voltage heating system in accordance with claim 8, wherein said connecting leads of said outer wires of each said star cables are both connected to one of said two busbars, and said connecting lead of said inner wire of said cable is connected to the other one of said two busbars.

10. An extra-low-voltage heating system in accordance with claim 9, wherein each cable of said plurality of cables comprises only one cable run and wherein currents flowing in correspondingly-located wires of said cable runs have substantially the same magnitudes and directions at an instant when a current in said inner one of said wires of each said cables is substantially maximum.

11. An extra-low-voltage heating system in accordance with claim 10, wherein said resultant magnetic flux density B is measured approximately in a middle of said surface area at a distance H perpendicular to said horizontal axes of said star cables, and wherein said distance H is less than 1.7 times said distance $D_R$.

12. An extra-low-voltage heating system in accordance with claim 11, wherein said resultant magnetic flux density B has a said specific value no greater than that given by a single-phase similar-flow configuration formula:

$$B = \frac{1.33d^2\sqrt{\frac{AP_C}{\rho}}}{H^3}$$

wherein the symbols carry the following units: d and H in meters, A in square meters, $P_C$ in watts per meter, ρ in ohm-meters and B in milligauss, and wherein said d is the distance between adjacent wires in said row, A is the total cross section of all three wires in the cable $P_C$ is the thermal power per unit length of cable, ρ is the resistivity of the wire material and said distance H is perpendicular to the Diane of said horizontal axes of said star cables and less than 1.7 times said distance $D_R$.

13. An extra-low-voltage heating system in accordance with claim 9, wherein each said star cable has two or more contiguous cable runs.

14. An extra-low-voltage heating system in accordance with claim 13, wherein said resultant magnetic flux density B is measured approximately in a middle of said surface area at a distance H perpendicular to said horizontal axis of each said single-phase star cables, and wherein said distance H is generally less than 1.7 times said distance $D_R$.

15. An extra-low-voltage heating system in accordance with claim 14, wherein said resultant magnetic flux density B has a said specific value no greater than that given by a single-phase alternate-flow configuration formula:

$$B = \frac{2d^2\sqrt{\frac{AP_C}{\rho}}}{H^3}$$

wherein the symbols carry the following units: d and H in meters, A in square meters, PC in watts per meter, ρ in ohm-meters and B in milligauss, and wherein said d is the distance between adjacent wires in said row, A is the total cross section of all three wires in the cable, $P_C$ is the thermal power per unit length of cable, ρ is the resistivity of the wire material and said distance H is perpendicular to the plane of said horizontal axes of said star cables and less than 1.7 times said distance $D_R$.

16. An extra-low-voltage heating system in accordance with claim 1, wherein said surface area is a flat surface area.

17. An extra-low-voltage heating system in accordance with claim 1, wherein said surface area is a non-flat surface area.

18. An extra-low-voltage heating system as claimed in claim 1, wherein each of said at least one cable is further provided with a bare sensing conductor extending along the entire length thereof and in close proximity to said conductive heating wires, said sensing conductor being connected at one end to an insulated conductor which is in turn connected to an output of a monitoring device to detect a fault in one or more of said heating wires.

19. An extra-low-voltage heating system as claimed in claim 18, wherein said monitoring device comprises an a.c. source that charges a capacitor by means of a diode connected between said a.c. source and said capacitor, an intermittently actuatable switch and a lamp connected in series between said capacitor and said output; said lamp being caused to blink, when a short-circuit occurs between one of said bare conductors and any of said conductive heating wires in any of said cables by a discharge current of said capacitor into said short-circuit and through said lamp and said intermittently actuatable switch.

20. An extra-low-voltage heating system as claimed in claim 19, wherein a further switch is connected across said lamp to bypass said lamp when said further switch is closed, to increase said discharge current through said short-circuit, whereby to obtain a stronger pulsating magnetic field surrounding said insulated conductor and said sensing conductor that lead to said short circuit, whereby to locate said short-circuit.

21. An extra-low-voltage heating system in accordance with claim 1, wherein said supply source is a single-phase source having a step-down transformer, said feeder conductor means being constituted by flat copper bars stacked one on top of another and separated by electrically insulating flat strips; there being three of said copper bars composed of a central bar and two outer bars, said central bar being sandwiched between said outer bars, and wherein each of said outer bars has half the thickness of said central bar, said central bar being connected at a near end of said feeder conductor means to a first one of two secondary terminals of said transformer, said outer bars being connected at said near end to a second one of said secondary terminals, said busbar configuration resulting in a reduction of the flux density around said feeder conductor means when currents flow through said busbars.

22. An extra-low voltage heating system in accordance with claim 21 wherein said heating wires are connected to said feeder conductor means so that said current in each said outer bar is substantially one-half the current in said central bar at common points along said feeder conductor means.

23. An extra-low-voltage heating system as claimed in claim 1, wherein said cables have a flat, substantially rectangular cross-section.

24. An extra-low-voltage heating system in accordance with claim 1, wherein an external portion of said insulated sheath lying on one side of said row and substantially parallel to said horizontal axis, bears a marking for the purpose of properly orienting said cable relative to said surface area.

* * * * *

UNITED STATES PATENT AND TRADEMARK OFFICE
CERTIFICATE OF CORRECTION

PATENT NO. : 5,814,792
DATED : September 29, 1998
INVENTOR(S) : THEODORE WILDI

It is certified that error appears in the above-identified patent and that said Letters Patent is hereby corrected as shown below:

IN THE DRAWINGS

Figure 2a, change "1A, 1B and 1C" to $I_A$, $I_B$ and $I_C$ ---.

Figure 4, change "20" to --- $2\theta$ ---.

Figure 5, change "4" (leading to the arrow) to --- 4' ---.

Figure 8, change "a, b, c" (for the lines passing through the loop 11) to --- A, B, C ---.

Figure 12, change "TRANSFOMER" to --- TRANSFORMER ---.

Figure 13a, add "$I_A$" on the same line as 1; add "$I_B$" on the same line as 2; and add "$I_C$" on the same line as 3.

Figure 14, change "$30^o$" to --- $3\theta$ ---.

Column 4, line 3, change "$60^o$ C." to --- $60^oC$ ---.

Column 5, line 40, delete "of" (first occurrence).

Column 6, line 44, change "$B_HB \sin \theta$" to --- $B_H = B \sin \theta$ ---.

Column 7, line 61, change "22.50" to --- $22.5^o$ ---.

Column 8, lines 49, 50 and 54, change "PC" to --- $P_C$ ---.

UNITED STATES PATENT AND TRADEMARK OFFICE
CERTIFICATE OF CORRECTION

PATENT NO. : 5,814,792

DATED : September 29, 1998

INVENTOR(S) : THEODORE WILDI

It is certified that error appears in the above-identified patent and that said Letters Patent is hereby corrected as shown below:

Column 10, lines 28 and 29, change "Flux density above a heated surface area (three-phase source)" to ---Flux density above a heated surface area (three-phase source) ---.

Column 11, line 50, change "Monitoring the integrity of the heating system" to --- Monitoring the integrity of the heating system ---.

Column 12, line 25, change "Star cable and single-phase source" to --- Star cable and single-phase source ---.

Column 13, line 15, change " [0]" to --- [$^{o}$]---.

Column 13, line 46, change "Cable configuration (single-phase source) to --- Cable configuration (single-phase source) ---.

Column 14, line 31, change "Flux density above a heated surface area (single-phase source)" to --- Flux density above a heated surface area (single-phase source) ---.

Column 15, line 33, change "DR" to --- $D_R$---.

Column 15, line 58, change "Cable parameters and characteristics" to --- Cable parameters and characteristics ---.

Column 15, line 62, change "90$^{o}$ C.," to --- 90$^{o}$ C, ---.

UNITED STATES PATENT AND TRADEMARK OFFICE
CERTIFICATE OF CORRECTION

PATENT NO. : 5,814,792

DATED : September 29, 1998

INVENTOR(S) : THEODORE WILDI

It is certified that error appears in the above-identified patent and that said Letters Patent is hereby corrected as shown below:

Column 16, Table 2, line 17, change "metro" to --- metre ---.

Column 16, line 58, change "$O_o$" to --- $I_0$ ---.

Column 17, line 26, change "Choice of wire material and individual cable length" to --- Choice of wire material and individual cable length ---.

Column 17, line 41, change "P/PC" to --- $P/P_C$ ---.

Column 20, line 34, change "Magnetic field produced by single-phase feeder" to --- Magnetic field produced by single-phase feeder ---.

Column 24, line 12, change "Diane" to --- plane ---.

Column 24, line 34, change "PC" to --- $P_C$ ---.

Signed and Sealed this

Thirty-first Day of August, 1999

Attest:

Q. TODD DICKINSON

Attesting Officer

*Acting Commissioner of Patents and Trademarks*